United States Patent
Misawa

(10) Patent No.: US 7,647,511 B2
(45) Date of Patent: Jan. 12, 2010

(54) METHOD FOR CHARGING DATA PROCESSING APPARATUS HAVING TWO SEPARATE UNITS

(75) Inventor: Atsushi Misawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 494 days.

(21) Appl. No.: 11/505,913

(22) Filed: Aug. 18, 2006

(65) Prior Publication Data

US 2007/0043962 A1 Feb. 22, 2007

(30) Foreign Application Priority Data

Aug. 18, 2005 (JP) ............................. 2005-237388

(51) Int. Cl.
*G06F 1/26* (2006.01)
(52) U.S. Cl. .................... 713/300; 713/330; 455/556.1; 455/556.2; 455/557; 455/573
(58) Field of Classification Search ................. 713/300; 455/556.1, 556.2, 557
See application file for complete search history.

(56) References Cited

U.S. PATENT DOCUMENTS

| 5,656,914 | A | * | 8/1997 | Nagele et al. ................ 320/110 |
| 6,009,336 | A | * | 12/1999 | Harris et al. ................. 455/566 |
| 6,624,616 | B1 | * | 9/2003 | Frerking et al. ............. 320/162 |
| 6,731,952 | B2 | * | 5/2004 | Schaeffer et al. ............ 455/557 |
| 7,203,777 | B2 | * | 4/2007 | Morita et al. ................. 710/74 |
| 2003/0030412 | A1 | * | 2/2003 | Matsuda et al. ............. 320/127 |
| 2003/0045327 | A1 | * | 3/2003 | Kobayashi et al. .......... 455/557 |
| 2004/0036791 | A1 | * | 2/2004 | Voss et al. ............. 348/333.07 |
| 2004/0225832 | A1 | * | 11/2004 | Huang ........................ 711/105 |

FOREIGN PATENT DOCUMENTS

| CN | 1227978 A | 9/1999 |
| JP | 11-266381 A | 9/1999 |
| JP | 2000-134817 A | 5/2000 |
| JP | 2003-348763 A | 12/2003 |

OTHER PUBLICATIONS

Notification of Second Office Action from the State Intellectual Property Office of PRC issued Oct. 31, 2008, in corresponding CN application 2006101114490 (3 pages in English).

\* cited by examiner

*Primary Examiner*—Nitin C Patel
(74) *Attorney, Agent, or Firm*—Sughrue Mion, PLLC

(57) ABSTRACT

When a plurality of electric devices is charged, each electric device is charged by priorities. The data processing apparatus related to the present invention comprises; a first data processing unit which comprises a first memory, a first data control section and a first battery; a second data processing unit which comprises a second memory, a second data control section and a second battery. The first data processing unit and the second data processing unit can be mechanically attached to and removed from each other. The data processing apparatus related to the present invention comprises; a data transfer control section which transfers data between the first memory and the second memory when the first data processing unit and the second data processing unit are mechanically connected with each other; and charge control sections which charge the first battery and the second battery when the first data processing unit and the second data processing unit are mechanically connected with each other, and the data processing apparatus is connected to the external power supply means.

11 Claims, 12 Drawing Sheets

METHOD FOR CHARGING DATA PROCESSING APPARATUS HAVING TWO SEPARATE UNITS

CROSS REFERENCE

The present application relates to and claims priority from a Japanese Patent Application No. 2005-237388 filed in Japan on Aug. 18, 2005, the contents of which are incorporated herein by reference for all purpose.

BACKGROUND OF THE INVENTION

1. Field of the Invention

The present invention relates to a data processing apparatus and a data processing method. Especially, the invention relates to a data processing apparatus and a data processing method, which can charge a plurality of data processing apparatus by priorities.

2. Related Art

A battery charging apparatus which charges both an internal battery pack included in a handy terminal and a removable battery pack has been proposed. The battery charging apparatus charges the internal battery pack prior to the removable battery pack. While the internal battery pack included in the handy terminal is being charged, even if the removable battery pack is connected to the battery charging apparatus, the battery charging apparatus continues to charge the internal battery pack. While the removable battery pack is being charged, however, if the internal battery pack included in the handy terminal is connected to the battery charging apparatus, the battery charging apparatus stops to charge the removable battery pack and starts to charge the internal battery pack. Such battery charging apparatus is disclosed, for example, in Japanese Patent Application Publication No. 2000-134817. There is also proposed a battery charge control method which includes comparing the voltages of an internal battery of an electric device and an adapter, and charging the internal battery of the electric device when the difference between the voltages is smaller than predetermined, or charging a removable battery when the difference between the voltages is larger than predetermined as disclosed, for example, in Japanese Patent Application Publication No. 2003-348763.

Another digital camera is proposed, which has the first display means functioning as a viewfinder used while capturing an image, and the second display means for operating as a display monitor used for reproducing the captured image, being removable from the camera, and also called an external display monitor. The first display means and the external display monitor display different contents. Further, an electronic camera has been disclosed. In the electronic camera, a user of the camera can compare the captured images displayed on both the first display means and the external display monitor to choose better image. The user can also check easily how the captured image is adjusted and corrected as disclosed, for example, in Japanese Patent Application Publication No. 1999-266381.

According to the above-described conventional art, only the internal battery pack included in the handy terminal and the removable battery pack used for the handy terminal are charged. Additionally, only the battery charge control method by which the electric device and the battery thereof are charged is disclosed.

Further, the user can check the captured images with both the first display means, which are included in the digital camera, and the external display monitor, but the user may want to check the captured image with a larger size display section. After the captured image is transferred to another storage media from the digital camera, the user cannot see the captured image on the digital camera. When the digital camera is connected to the external display device such as a television monitor to see the captured images displayed on the external display device, the user has to operate the digital camera connected to the external display area to display the captured images on the external display area. The user, therefore, cannot view the captured images displayed on the external display area sufficiently. The above-described conventional art is silent with respect to batteries which is required for driving the digital camera and the external display device.

SUMMARY OF THE INVENTION

It is therefore an object of the present invention to provide a data processing apparatus and the data processing method capable of solving the afore-mentioned problems. The object can be accomplished by combinations of features described in the independent claims. The dependent claims further provide useful applications of the present invention.

To solve the above problems, a first aspect of the present invention provides a data processing apparatus, the data processing apparatus includes; a first data processing unit which includes a first memory, a first data control section for reading/writing data from/to the first memory, a first battery for supplying power to the first memory and the first data control section; a second data processing unit which includes a second memory, a second data control section for reading/writing data from/to the second memory, a second battery supplying power to the second memory and the second data control section. The first data processing unit and the second data processing unit can be mechanically attached to and removed from each other. The data processing apparatus further includes; a data transfer control section which transfers data between the first memory and the second memory, when the first data processing unit, and the second data processing unit are mechanically connected with each other; and a charge control section which charges the first battery and the second battery when the first data processing unit and the second data processing unit are mechanically connected with each other, and when the data processing apparatus is also connected to an external power supply means.

The first data processing unit may further include an image capturing section, and the fist data control section may write the image captured by the image capturing section to the fist memory. The second data processing unit may further include a display section, and the second data control section may display the image read from the second memory on the display section. The first data processing unit may independently function as an image capturing apparatus when it isn't connected mechanically to the second data processing unit. The second data processing unit may independently function as a display device when it isn't connected mechanically to the first data processing unit. The data transfer control section may transfer the image, which is captured by the image capturing section and stored in the first memory, to the second memory when the first data processing unit is connected with the second data processing unit.

The data processing apparatus may further comprise a battery charger which holds the assembly comprising the first data processing unit and the second data processing unit, both of which are connected with each other, and has a primary terminal and a secondary terminal, both of which are electrically connected to an external power supply means. The first data processing unit may comprise a first power supply terminal, which is selectively connected to either the primary terminal or the secondary terminal, when the first data processing unit is held by the battery charger. The second data processing unit may comprise a second power supply terminal, which is selectively connected to either the primary terminal or the secondary terminal, when the second data processing unit is held by the battery charger. The charge control section may charge the first battery prior to the second battery when the first power supply terminal is connected to the primary terminal, and the second power supply terminal is connected to the secondary terminal. The charge control section may also charge the second battery prior to the first battery when the first power supply terminal is connected to the secondary terminal, and the second power supply terminal is connected to the primary terminal.

The first data processing unit may comprise the first power supply terminal which is electrically connected to the external power supply means. The second data processing unit may comprise the second power supply terminal which is electrically connected to the external power supply means. The charge control section may charge the first battery prior to the second battery when the first power supply terminal is connected to the external power supply means, and may charge the second battery prior to the first battery when the second power supply terminal is connected to the external power supply means. The charge control section may also supply power to the first battery from the external power supply means to charge the first battery when the charge control section is connected to the external power supply means, and may supply power to the second battery from the first battery to charge the second battery when the charge control section is cut off from the external power supply means.

A second aspect of the present invention provides a data processing method used for a data processing apparatus. The data processing apparatus comprises; a first data processing unit which comprises a first memory, a first data control section for writing/reading data to/from the first memory, a first battery supplying power to the first memory and the first data control section; a second data processing unit which comprises a second memory, a second data control section for writing/reading data to/from the second memory, a second battery supplying power to the second memory and the second data control section. The first data processing unit and the second data processing unit can be attached to or removed from each other mechanically. The data processing method includes; a data transfer controlling process in which data is transferred between the first memory and the second memory when the first data processing unit and the second data processing unit are mechanically connected with each other; and a charge controlling process in which the first battery and the second battery are charged when the first data processing unit and the second data processing unit are mechanically connected each other, and when the data processing apparatus is also connected to an external power supply means. In the charge controlling process, the data processing apparatus supplies power from the external power supply means to charge the first battery when the data processing apparatus is connected to the external power supply means, and supplies power from the first battery to the second battery to charge the second battery when the data processing apparatus is cut off from the external power supply means.

A third aspect of the present invention provides a data processing apparatus, the data processing apparatus comprises; a first data processing unit which comprises a first memory, a first data control section for writing/reading data to/from the first memory, and a first battery supplying power to the first memory and the first data control section; a second data processing unit which comprises a second memory, a second data control section for writing/reading data to/from the second memory, and a second battery which supplies power to the second memory and the second data control section; and a charge control section which charges the first battery and the second battery by priorities depending on the free areas on the first memory and the second memory. The charge control section may charge the second battery prior to the first battery if the free area on the second memory is larger than that on the first memory. The charge control section may charge the second battery prior to the first battery if the ratio of the free area to the total area of the first memory is larger than that of the second memory.

According to the third embodiment, a data processing method used for a data processing apparatus which comprises a first data processing unit, a second data processing unit. The first data processing unit comprises; a first memory; a first data control section for writing/reading data to/from the first memory; and a first battery which supplies power to the first memory and the first data control section. The second data processing unit comprises; a second memory; a second data control section for writing/reading data to/from the second memory; and a second battery which supplies power to the second memory and the second data control section. The data processing method includes a charge controlling process in which the data processing apparatus charges the first battery and the second battery by priorities depending on free areas of the first memory and the second memory.

The above description of the present invention doesn't cite all the features of the present invention. The sub-combinations of these features may also be inventions.

According to the present invention, when a plurality of electric devices is charged, each electric device can be charged by priorities.

DETAILED DESCRIPTION OF THE INVENTION

The following description explains the present invention with embodiments. The embodiments described below do not limit the invention claimed herein. All of the combinations described on the embodiments are not essential to the solutions of the present invention.

Figure 1:
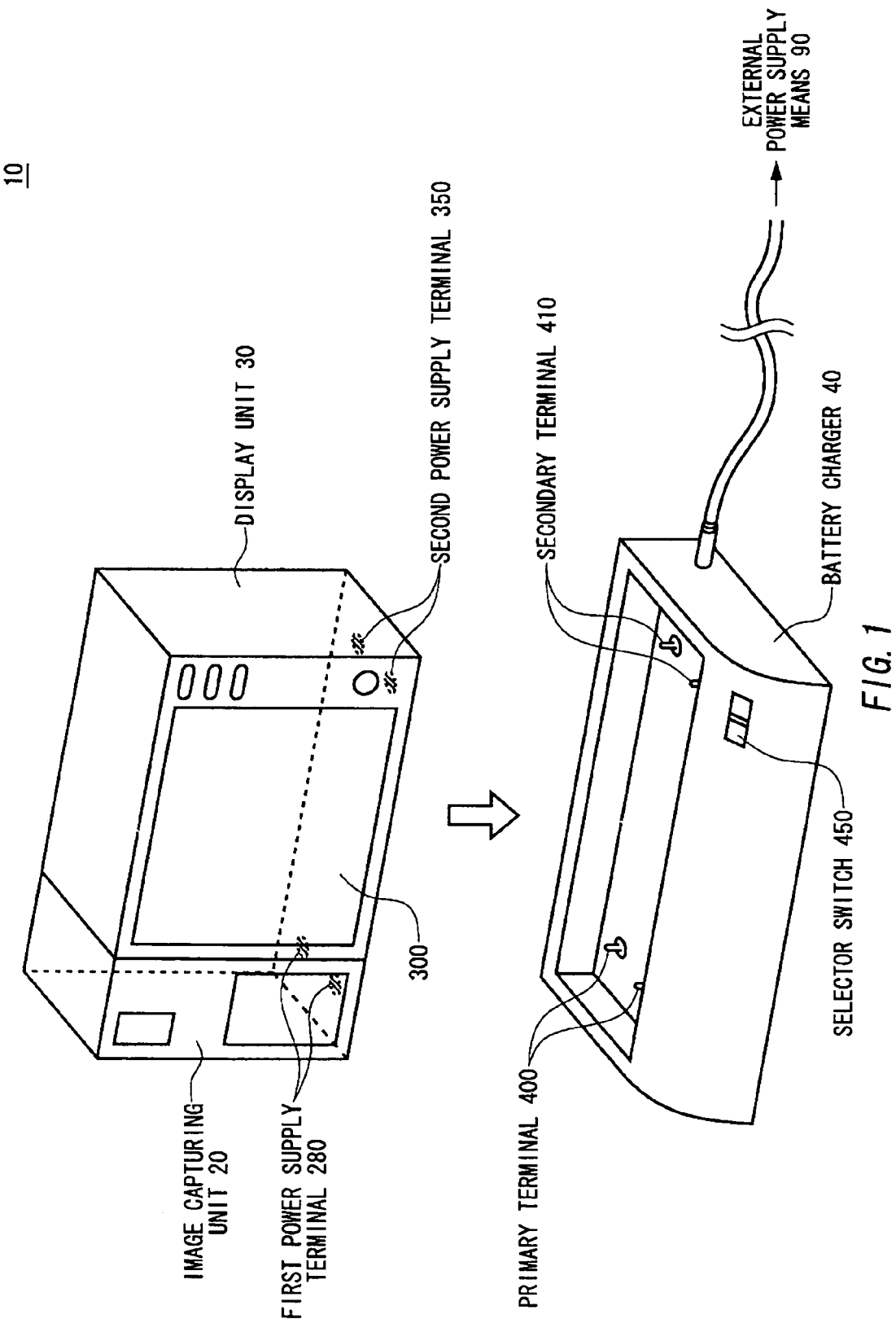
FIG. 1 is a schematic view of the data processing apparatus 10.

FIG. 1 schematically shows the data processing apparatus 10 related to an embodiment of the present invention. The data processing apparatus 10 comprises a battery charger 40, an image capturing unit 20, and a display unit 30. The image capturing unit 20 has a first power supply terminal 280. The display unit 30 has a second power supply terminal 350. The battery charger 40 has a primary terminal 400, a secondary terminal 410, and a selector switch 450. The battery charger is connected to an external power supply means 90. The image capturing unit 20 and the display unit 30 are mechanically attached to and removed from each other. The assembly comprising the image capturing unit 20 and the display unit 30, both of which are mechanically connected each other, works as the data processing apparatus 10. The image capturing unit 20 and the display unit 30 are examples of the electric devices. The data processing apparatus 10 related to the present embodiment has the purpose to charge each electric device by priorities as desired by a user when a plurality of electric devices is charged.

By the user's operation, the image capturing unit 20 captures an image. The image capturing unit 20 stores the captured image data in a memory included in the image capturing unit 20. When the display unit 30 is connected to the image capturing unit 20, the captured image data is provided from the image capturing unit 20 to the display unit 30, and stored in a memory included in the display unit 30. The display unit 30 comprises a display section 300 in which the image captured by the user can be displayed. The image capturing unit 20 may compress the captured image data and hold the compressed image data. The user can review the image which is captured by the image capturing unit 20, and displayed on the display unit 30. The display unit 30 may be driven by a battery so that the user can bring the display unit 30 with him or her and see captured images for sufficient time.

When respective batteries of the image capturing unit 20 and the display unit 30 are charged, the assembly comprising the image capturing unit 20 and the display unit, both of which are mechanically connected with each other, is hold on the battery charger 40 to be charged both the image capturing unit 20 and the display unit 30. The data processing apparatus 10 has a first power supply terminal 280 on the bottom of the image capturing unit 20, and a second power supply terminal 350 on the bottom of the display unit 30. The bottoms described above may be contact surfaces with the battery charger 40 when the image capturing unit 20 and the display unit 30 are charged. The first power supply terminal 280 are placed in symmetry to the second power supply terminal 350 on the bottom surface of the assembly comprising the image capturing unit 20 and the display unit, both of which are mechanically connected with each other. The user rotates the data processing apparatus 10 by 180 degrees around the axis which is perpendicular to the surface including the primary terminal 400 and the secondary terminal 410 of the battery charger 40 in order to connect the first power supply terminal 280 of the image capturing unit 20 and the second power supply terminal 350 of the display unit 30 to the primary terminal 400.

The user, therefore, can charge both the image capturing unit 20 and the display unit 30 without using respective battery chargers for the image capturing unit 20 and the display unit 30.

If the user wants a device to be charged faster than another device, the data processing apparatus 10 is held on the battery charger 40 so that the connecting terminal of the device is connected to the primary terminal 400 of the battery charger 40. This allows the device connected to the primary terminal 400 to be charged primarily. For example, if the user wants the image capturing unit 20 to be charged prior to the display unit 30, the image capturing unit 20 is held on the battery charger 40 so that the image capturing unit 20 is connected to the primary terminal 400. If the user wants the display unit 30 to be charged prior to the image capturing unit 20, the display unit 30 is held on the battery charger 40 so that the display unit 30 is connected to the primary terminal 400. The user, therefore, can freely choose to give priorities to devices to be charged only with one battery charger 40.

The battery charger 40 may have a selector switch 450 which selects a device to be charged by priority. If the user has a device to be charged prior to another device, the user can charge the device primarily by selecting with the selector switch 450 included in the battery charger 40. For example, if the user requests to the display unit 30 to be charged prior to the image capturing unit 20, the selector switch 450 is switched so that the display unit 30 is connected to the primary terminal 400. This allows the user to charge the display unit 30 primarily.

After the battery charger 40 completes charging the electric device connected to the primary terminal 400, the battery charger 40 may charge the other electrical device. The battery charger 40 can also alternately charge the battery of the electric device connected to the primary terminal 400 and the battery of the electrical device connected to the secondary terminal 400 in every certain amount. The battery charger 40 can further charge the electrical device connected to the primary terminal 400 and the battery of the electrical device connected to the secondary terminal 400 along with each other.

The data processing apparatus 10 related to the present embodiment can operate to charge each electrical device by priorities when a plurality of electrical devices are charged.

Figure 2:
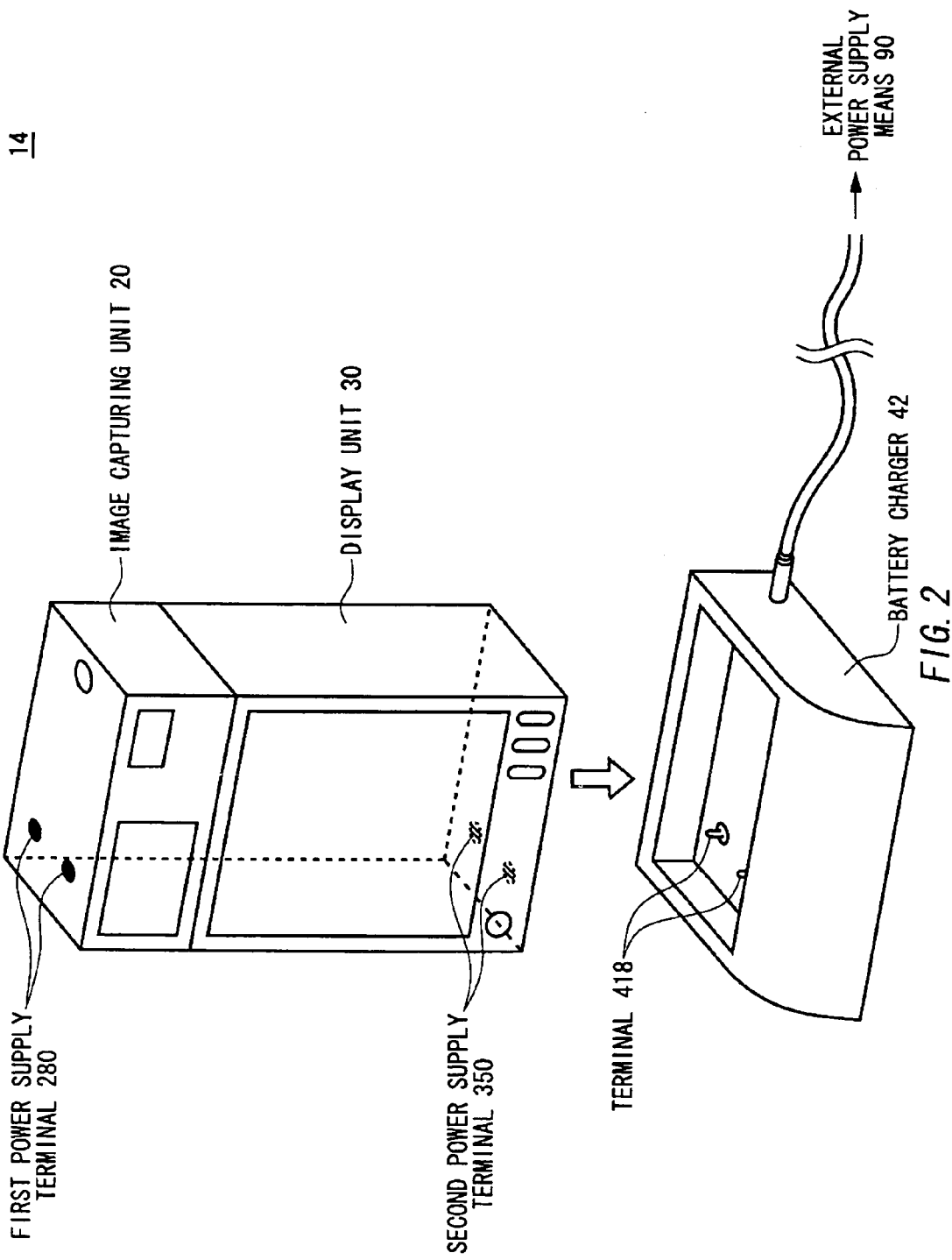
FIG. 2 is a schematic view of the data processing apparatus 14.

FIG. 2 schematically shows the data processing apparatus 14 related to the present embodiment. The data processing apparatus 14 comprises a battery charger 42, an image capturing unit 20, and a display unit 30. The battery charger 42 comprises a terminal 418. The battery charger 42 is connected to an external power supply means 90. The image capturing unit 20 and the display unit 30 are mechanically attached to and removed from each other.

The assembly comprising the image capturing unit 20 and the display unit 30, both of which are mechanically connected with each other, is held on the battery charger 42 and either of the image capturing unit 20 or the display unit which is required to be charged first is connected to the terminal 418 of the battery charger 42. The battery charger 42 is connected to the external power supply means 90.

Now consider the data processing apparatus 14 which comprises the image capturing unit 20 and the display unit 30, both of which are mechanically connected with each other. In the data processing apparatus 14, the first power supply terminal 280 of the image capturing unit 20 and the second power supply unit 30 of the display unit 30 are placed in the surfaces, each of which is opposite to the contact surface of the image capturing unit 20 and the display unit 30. In the data processing apparatus 14, the first power supply terminal 280 and the second power supply terminal 350 are in the same positions on the same shape and opposite surfaces. When the data processing unit 14 is held on the battery charger 42 with the image capturing unit 20 side down, the first power supply terminal 280 is connected to the terminal 418 included in the battery charger 42. When the data processing unit 14 is held on the battery charger 42 with the display unit 20 side down, the second power supply terminal 280 is connected to the terminal 418 included in the battery charger 42. This allows either the image capturing unit 20 or the display unit 30 to be charged first. The user can select either the image capturing device 20 or the display unit 30 to be charged first by turning the data processing apparatus upside down to be held on the battery charger 42. The user, therefore, can easily and apparently know which is charged first between the image capturing unit 20 and the display unit 30.

For example, when the data processing apparatus 14 is held on the battery charger 42, the display unit 30, which is connected to the terminal 418, is charged prior to the image capturing unit 20. After the display unit 30 is completed to be charged, the image capturing unit 20 is started to be charged via the display unit 30. If the user wants the image capturing unit 20 to be charged prior to the display unit 30, the data processing unit is held so that the first power supply terminal 280 of the image capturing unit 20 are connected to the terminal 418 of the battery charger 42. In this case, the image capturing unit 20 is charged first, and then the display unit is charged via the image capturing unit 20.

According to the data processing apparatus 14 related to the present embodiment, while the assembly which comprises two electric devices mechanically connected with each other is held on the battery charger, the two electric devices can be charged by priorities. This allows the user to charge the electric device which he or she wants to use sooner.

Figure 3:
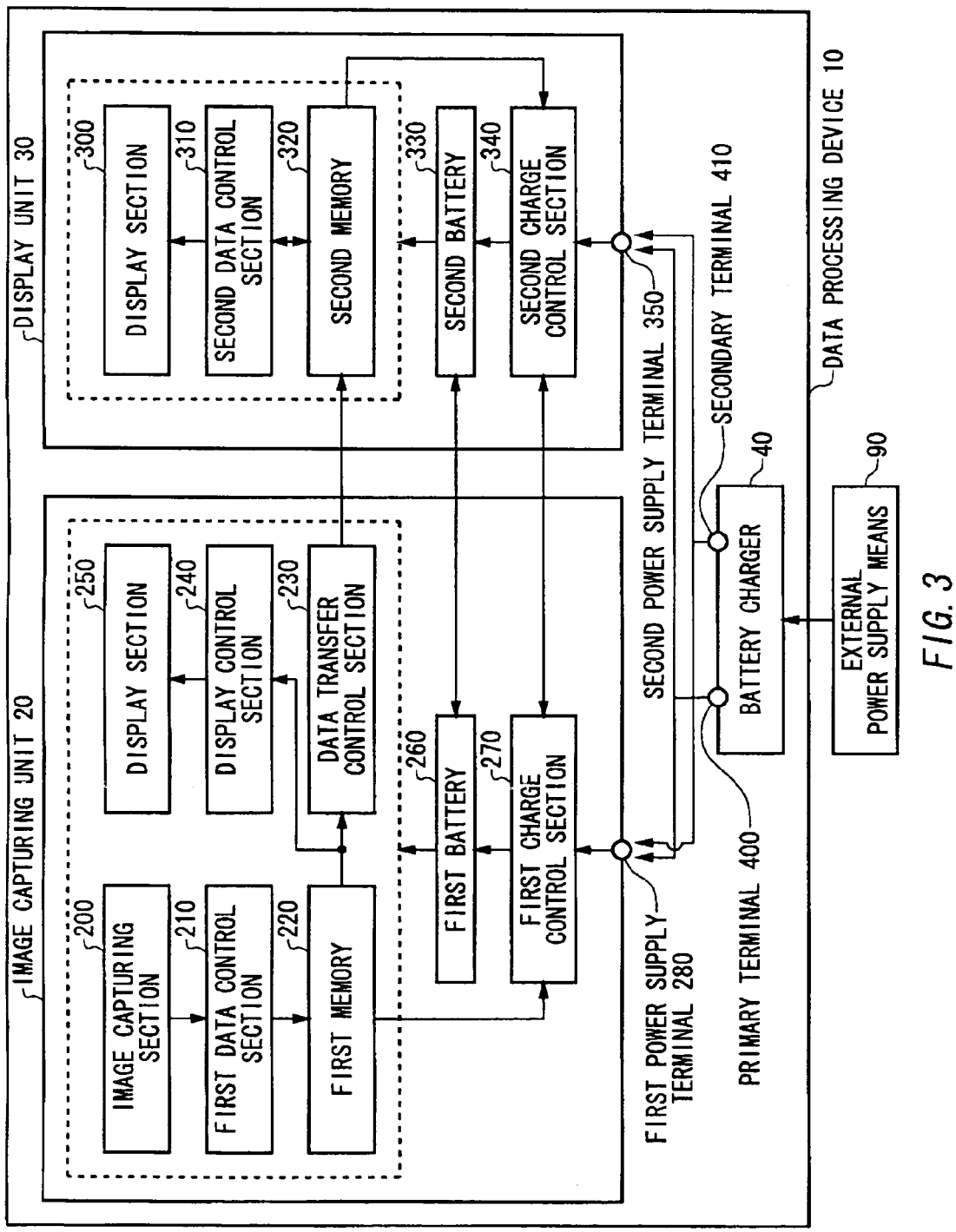
FIG. 3 is a block diagram showing the functional composition of the data processing apparatus 10.

FIG. 3 is a block diagram showing the functional composition of the data processing apparatus 10 related to the present embodiment. The data processing apparatus 10 comprises the image capturing unit 20, the display unit 30, and the battery charger 40. The image capturing unit 20 comprises the image capturing section 200, the first data processing section 210, the first memory 220, the data transfer control section 230, the display control section 240, the display section 250, the first battery 260, the first charge control section 270, and the first power supply terminal 280. The display unit 30 comprises the display section 300, the second data control section 310, the second memory 320, the second battery 230, the second charge control section 340, and the second power supply terminal 350. The data transfer control section 230 may be included in either the image capturing unit 20 or the display unit 30. The display unit 30 may comprise the data transfer control section 230. The battery charger 40 comprises the primary terminal 400, and the secondary terminal 410. The charge control section may be included in the one out of the image capturing unit 20, the display unit 30, and the battery charger 40.

The image capturing section 200 included in the image capturing unit 20 provides data of a captured image to the first data control section 210. The first data control section 210 writes/reads data to/from the first memory 220. The first data control section 210 may receive the image data of the image, which is captured by the image capturing section 200, from the image capturing section 200, and write the image data to the first memory 220. The first data control section 210 may also read from the first memory 220. The first data control section 210 provides the first memory 220 with the image data of the image captured by the image capturing section 200.

The first memory 220 stores the data such as the image data received from the first data control section 210. For example the first memory 220 stores the image data received from the first data control section 210. The first memory 220 may store the image data as corresponding to identifiers, each of which relates to only one image. The first memory 220 is a storage device in which the image captured by the image capturing section 200 is stored. Examples of the first memory 220 are a memory using semiconductor memory media and a hard disc drive using magnetic recording media. The first memory 220 may also be a storage device which freely attaches to and removed from the image capturing unit 20. The first memory 220 provides the image data to both the display control section 240 and the data transfer control section 230. The first memory 220 also provides the first charge control section 270 with the data related to the capacities of the first memory 220. The capacity related data indicates, for example, the free space on the first memory 220 and the ratio of the free space to the total capacity of the first memory 220.

The image capturing unit 20 and the display unit 30 may have the first memory free space detector and the second memory free space detector. The first memory free space detector and the second memory free space detector detect the free spaces on the first memory 220 and the second memory 320, and the ratios of the free spaces to the total capacities thereof. The data of the free space on the first memory 220 and the ratio of the free space to the total capacity thereof, which is detected by the first memory free space detector, are provided from the first memory free space detector to the first charge control section 270. The data of the free space on the second memory 320 and the ratio of the free space to the total capacity thereof, which is detected by the second memory free space detector, are provided from the second memory free space detector to the second charge control section 340.

When the image capturing unit 20 and the display unit 30 are mechanically connected with each other, the data transfer control section 230 transfers data between the first memory 220 and the second memory 320. The second memory 320 is included in the display unit 30. If the image capturing unit 20 isn't mechanically connected with the display unit 30, the image capturing unit 20 may function as an independent image capturing device. For example, the image capturing unit 20 is a digital camera. If the display unit 30 isn't mechanically connected with the image capturing unit 20, the display unit 30 may function as an independent display device. For example, the display unit 30 is a mobile viewer. When the image capturing unit 20 and the display unit 30 are mechanically connected with each other, the data transfer control section 230 may transfer the image data to the second memory 320. The image data relates to the image captured by the image capturing section 200 and is stored in the first memory 220. The display control section 240 provides the display-section 250 with the image received from the first memory 220. The display section 250 displays the image received from the display control section 240. The display section 250 is a display device which displays the image captured by the image capturing section 200 such as a liquid crystal display device.

The second memory 320 included in the display unit 30 stores the data, such as the image data received from the data transfer control section 230. The second memory 320 may store the data, such as the image data via the network, such as the Internet, and memories. The second memory 320 gives the data, such as the image data, to be stored as corresponding to identifiers. Each identifier allows the data to be related to only one image. The second memory 320 provides the second data control section 310 with the data such as the image data. The second memory 320 provides the second charge control section 340 with the data related to the capacity of the second memory 320. For example, the data relates to the free space on the second memory 320 and the ratio of the free space to the total capacity of the second memory 320.

The second data control section 310 writes/reads data to/from the second memory 320. The data control section 310 may read the image data from the second memory 320 and provides the image data to the display section 300. The display section 300 displays the image data which is read from the second memory 320 and provided by the second data control section 310. The display section 300 may be a display device, such as a liquid crystal display device.

The first battery 260 supplies power to the image capturing section 200, the first data control section 210, the first memory 220, the data transfer control section 230, the display control section 240, and the display section 250. The first battery 260 may supply power to the battery 330 in a certain case for the purpose of charging the second battery 330 included in the display unit 30. The second battery 330 supplies power to the display section 300, the second data control section 310, and the second memory 320. The second battery 330 may supply power to the first battery 260 in a certain case for the purpose of charging the first battery 260 included in the image capturing unit 20.

When the first charge control section 270 and the second charge control section 340, which comprise the display unit 30, are mechanically connected with each other, the data processing apparatus 10 are connected to the external power supply means 90 to be charged the first battery 260 and the second battery 330. Consider the case in which the battery charger 40 holds the assembly comprising the image capturing unit 20 and the display unit 30, both of which are mechanically connected with each other. The battery charger 40 comprises the primary terminal 400, which is electrically connected to the external power supply means 90, and the secondary terminal 410. In this case, when the first power supply terminal 280 included in the image capturing unit 20 are connected to the primary terminal 400, and the secondary power supply terminal 350 included in the display unit 30 is connected to the 410, the first charge control section 270 and the second charge control section 340 charge the first battery 260 prior to the second battery 330.

When the first power supply terminal 280 included in the first data processing unit is connected to the secondary terminal 410, and the second power supply terminal 350 included in the display unit 30 is connected to the primary terminal 400, the first charge control section 270 and the second charge control section 340 charge the second battery 330 prior to the first battery 260. In this case, the first charge control section 270 and the second charge control section 340 may share the information about the connection combination of the first power supply terminal 280 and the second power supply terminal 350, and the primary terminal 400 and the secondary terminal 410. The user, therefore, can select the unit out of the image capturing unit 20 or the display unit 30 and charge the unit first.

When the external power supply means 90 supplies power to the data processing apparatus 10, the first charge control section 270 may charge the first battery 260. After the first battery 260 is completed to be charged, the second charge control section 340 may charge the second battery 330. When the external power supply means 90 doesn't supply power to the data processing apparatus 10, the first charge control section 270 may measure the battery power of the first battery 260, then if the battery power of the first battery 260 is a predetermined level or more, supply power to the second battery 330 via the first battery 260 to charge the second battery 330. When the external power supply means 90 supplies power to the data processing apparatus 10 the second battery 330 may be charged first. In this case, the second charge control section 340 may charge the second battery 330 first, and after the second battery 330 is completed to be charged, the first charge control section 270 may charge the first battery 260.

When the first charge control section 270 or the second charge control section 340 charges the first battery 260 or the second battery 330, the first charge control section 270 or the second charge control section 340 may control to fully charge the one of the first battery 260 and the second battery 330 first, and then charge the other. The first charge control section 270 or the second charge control section 340 may charge the first battery 260 and the second battery 330 alternately in every predetermined amount. The first charge control section 270 and the second charge control section 340 may charge the first battery 260 and the second battery 330 along with each other.

The first charge control section 270 provides the second charge control section 340 with the data related to the free space of the first memory 220 and the ratio of the free space to the total capacity of the first memory 220, and received from the first memory 220. The second charge control 340 may provide the first charge control section 270 with the data related to the free space on the second memory 320 and the ratio of the free space to the total capacity of the second memory 320. The first charge control section 270 and the second charge control section 340 may charge the one of the first battery 260 and the second battery 330 prior to the other depending on the free spaces of the first memory 220 and the second memory 320. For example, when the first memory 220 has a larger free space than the second memory 320, the second charge control section 340 charges the second battery 330 first. When the ratio of the free space on the first memory 220 to the total capacity thereof is larger the free space on the second memory 320 to the total capacity thereof, the second charge control section 340 may charge the second battery 330 first.

The display section 250 of the image capturing unit 20 and the display section 300 of the display unit 30 may display a menu by which either the image capturing unit 20 or the display unit 30 is selected to be charged first. When the user selects either the image capturing unit 20 or the display unit 30 to be charged first, the information about the image capturing unit 20 or the display unit 30 which is selected by the user is provided to the first charge control section 270 and the second charge control section 340. With the information about the image capturing unit 20 or the display unit 30 which is selected by the user, the first charge control section 270 and the second charge control section 340 may charge first either the first battery 260 included in the image capturing unit 20 or the second battery 330 included in the display unit 30 by priorities.

According to the data processing apparatus 10 related to the present embodiment, two different devices can exchange the data, and the batteries of the two devices can be given priorities to be charged. This allows the user to charge first the electric device which the user wants to use sooner, or uses more often.

According to the data processing apparatus 14 related to the present embodiment, the one of the first battery 260 and the second battery 330 can supply power to the other to charge the other. This allows the one battery to be charged the other without external power supply when the charging capacity is larger than predetermined in the battery of the one data processing unit. This can prevent the image capturing unit 20 and the display unit 30 from stopping their operations because of the other battery's run.

Figure 4:
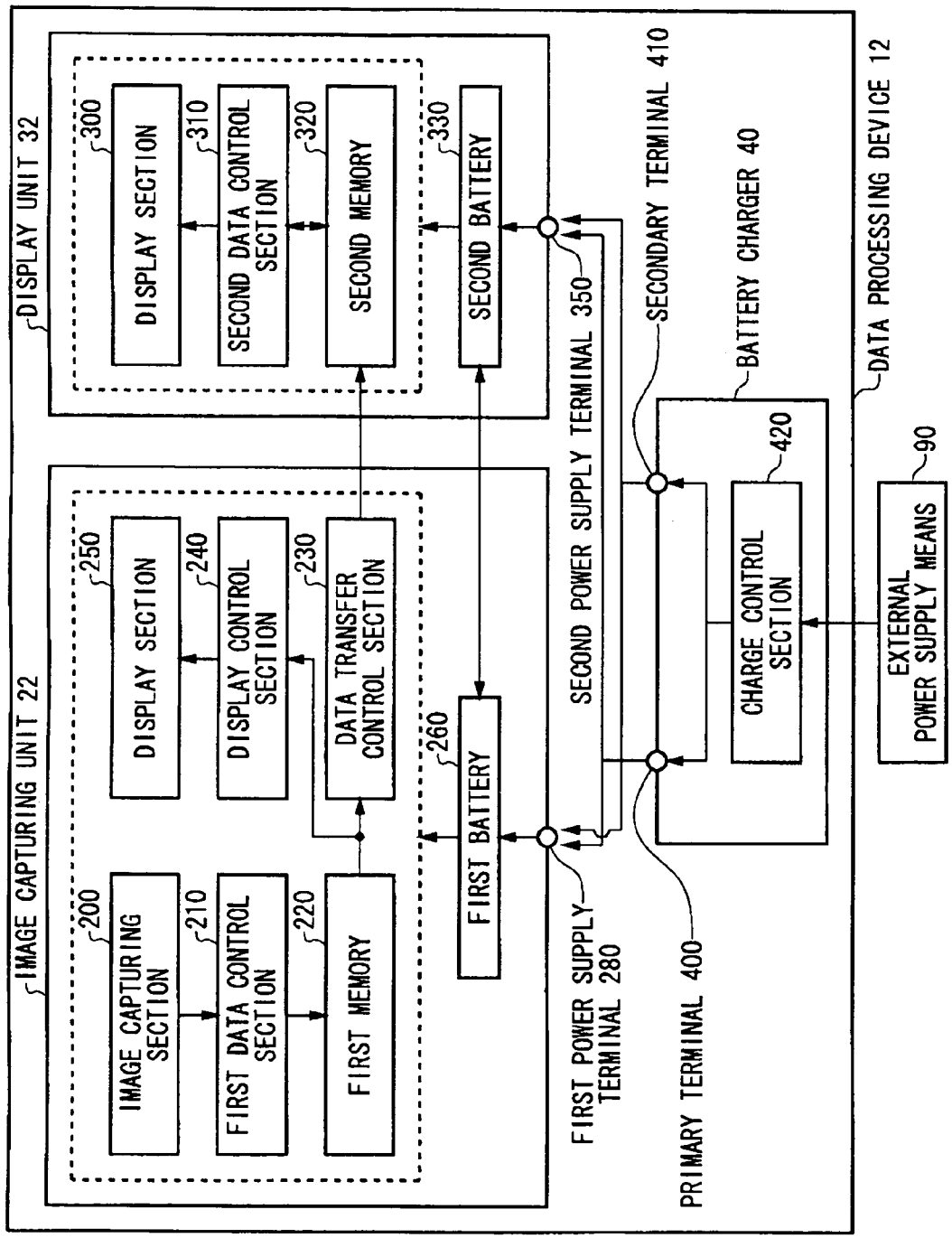
FIG. 4 is a block diagram showing the functional composition of the data processing apparatus 12.

FIG. 4 is a block diagram showing the functional composition of the data processing apparatus 12 related to the present embodiment. The data processing apparatus 12 comprises an image capturing unit 22, a display unit 32, and a battery charger 40. The image capturing unit 22 comprises a image capturing section 200, a first data control section 210, a first memory 220, a data transfer control section 230, a display control section 240, a display section 250, a first battery 260, and a first power supply terminal 280. The display unit 32 comprises a display section 300, a second data control section 310, a second memory 320, a second battery 330, and a second power supply terminal 350. The data transfer control section 230 may be included in either the image capturing unit 22 or the display unit 32. That is, the display unit 32 may comprise the data transfer control section 230. The battery charger 40 comprises a charge control section 420, a primary terminal 400, and a secondary terminal 410.

As to the image capturing unit 22, the display unit 32, the battery charger 40, the image capturing section 200, the first data control section 210, the first memory 220, the data transfer control section 230, the display control section 240, the display section 250, the first battery 260, the first power supply terminal 280, the display section 300, the second data control section 310, the second memory 320, the second battery 330, the second power supply terminal 350, the charge control section 420, the primary terminal 400, and the secondary terminal 410, each of these has approximately the same function as the component having the same reference number, so the descriptions about these are omitted.

The charge control section 420 included in the battery charger 40 charges the first battery 260 and the second battery 330 when the assembly comprising the image capturing unit 22 and the display unit 32, both of which are mechanically connected with each other, is held on the battery charger 40 which is connected to the external power supply 90. The charge control section 420 may charge the one of the first battery 260 and the second battery 330, and after completing to charge the one, charge the other. The charge control section 420 may charge the first battery 260 and the second battery 330 alternately in every predetermined amount. The battery control section 420 may also charge the first battery 260 and the second battery 330 along with each other. The charge control section 420 may charge first the unit which is connected to the primary terminal 400. For example, when the primary terminal 400 and the first power supply terminal 280 are connected with each other, the charge control section 420 may charge the first battery 260 first. When the secondary terminal 410 and the first power supply terminal 280 are connected with each other, the charge control section 420 may charge the second battery 330 first.

Figure 5:
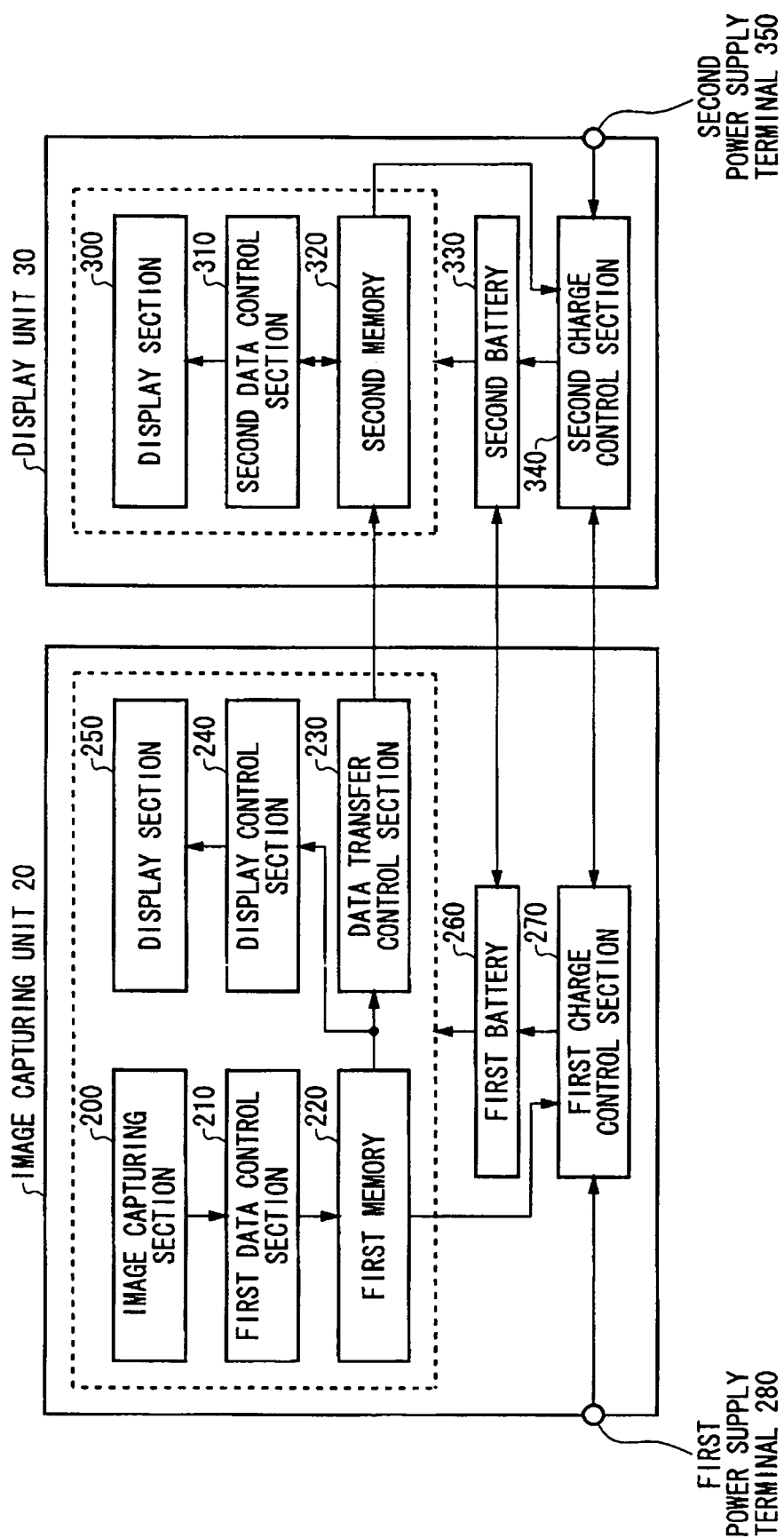
FIG. 5 is a block diagram showing the functional composition of the data processing apparatus 14.

FIG. 5 is a block diagram showing the functional composition of the data processing apparatus 14 related to the present embodiment. The data processing apparatus 14 comprises an image capturing unit 20 and a display unit 30. The image capturing unit 20 comprises a image capturing section 200, a first data control section 210, a first memory 220, a data transfer control section 230, a display control section 240, a display section 250, a first battery 260, a first charge control section 270, and a first power supply terminal 280. The display unit 30 comprises a display unit 300, a second data control section 310, a second memory 320, a second battery 330, a second charge control section 340, and a second power supply terminal 350. The data transfer control section 230 may be included in either the image capturing unit 20 or the display unit 30. That is, the display unit 30 may comprise the data transfer control section 230.

As to the image capturing section 20, the display unit 30, the image capturing section 200, the first data control section 210, the first memory 220, the data transfer control section 230, the display control section 240, the display section 250, the first battery 260, the first charge control section 270, the first power supply terminal, the display section 300, the second data control section 310, the second memory 320, the second battery 330, the second charge control section 340, and the second power supply terminal 350, each of these has the same function as the component which has the same reference number shown in the above description with FIGS. 3 and 4, so the descriptions about these are omitted.

The first charge control section 270 charges the first battery 260 prior to the second battery 330 when the first power supply terminal 280 is connected to the external power supply means. After the first battery 260 is completed to be charged, the first charge control section 270 may charge the second battery 330 via the second charge control section 340. After the first battery 260 is completed to be charged, the first charge control section 270 may also provide the power of the first battery 260 to the second battery 330 to charge the second battery 330. The second charge control section 340 charges the second battery 330 prior to the first battery 260 when the second power supply terminal 350 is connected to the external power supply means. After the second battery 330 is completed to be charged, the second charge control section 340 may charge the first battery 260 via the first charge control section 270. After the second battery 330 is completed to be charged, the second charge control section 340 may provide the power of the second battery 330 to the first battery 260 to charge the first battery 260.

According to the data processing apparatus 14 related to the present embodiment, the data processing unit is selected to be connected to the external power supply means so that the data processing unit can charge primarily. This allows the user to charge the electric device which he or she wants to use sooner.

Figure 6:
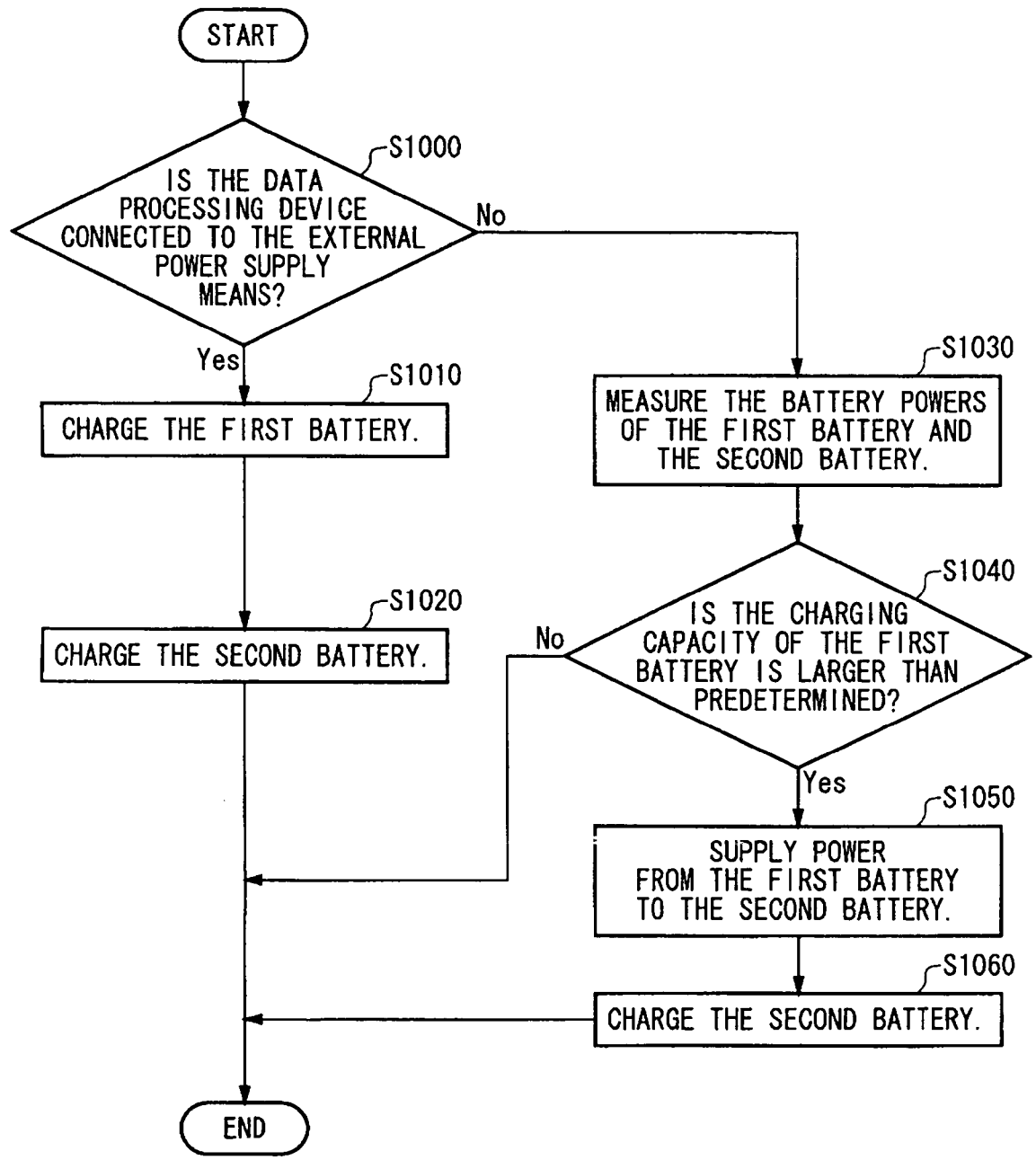
FIG. 6 is a flow chart showing the procedure used for the data processing apparatus 10.

FIG. 6 is a flow chart showing the procedure used for the data processing apparatus 10 related to the present embodiment. The first charge control 270 determines whether the data processing apparatus 10 is connected to the external power supply means 90 (S1000). If the data processing apparatus 10 is connected to the external power supply means 90 (S1000: Yes), the first charge control section 270 charges the first battery 260 (S1010). After the first battery 260 is completed to be charged, the first charge control section 270 provides the second charge control section 340 with the information that the first battery 260 is completed to be charged. Receiving the information that the first battery 260 is completed to be charged, the second charge control section 340 charges the second battery 330 (S1020).

If the data processing apparatus 10 isn't connected to the external power supply means 90 (S1000: No), the first charge control section 270 and the second charge control section 340 measure the battery powers of the first battery 260 and the second battery 330 respectively (S1030). The first charge control section 270 determines whether the charging capacity of the first battery 260 is larger than predetermined or not (S1040). For example, the first charge control section 270 may determine whether there is left the power required for operating the image capturing unit 20 in certain time or more, or whether the first battery 260 is fully charged or not.

If the first charge control section 270 determines that the charging capacity of the first battery 260 is equal to or larger than predetermined (S1040: Yes), the first charge control section 270 controls the first battery 260 to charge the second battery 330 (S1050). This allows the second battery 330 to be charged (S1060). If the first charge control section 270 determines that the charging capacity of the first battery 260 isn't larger than predetermined (S1040: No.), the procedure is finished.

In the above example, if the charging capacity of the first battery 260 is equal to or larger than predetermined, the first battery 260 is controlled to provide power to the second battery 330 to charge the second battery 330. There are other examples, too. If the charging capacity of the second battery 330 is equal to or larger than predetermined, the second battery 330 may be controlled to provide power to the first battery 260 to charge the first battery 260.

According to the data processing apparatus 10 related to the present embodiment when the data processing apparatus 10 is connected to the external-power supply means 90, the first battery 260 can be charged, and when the data processing apparatus 10 isn't connected to the external power supply means 90, either the second battery 330 or the first battery 260 can be charged depending on the charging capacities of the first battery 260 and the second battery 330. This can prevent the data processing apparatus 10 from running out of the batteries and stopping the operations of both the image capturing unit 20 and the display unit 30.

Figure 7:
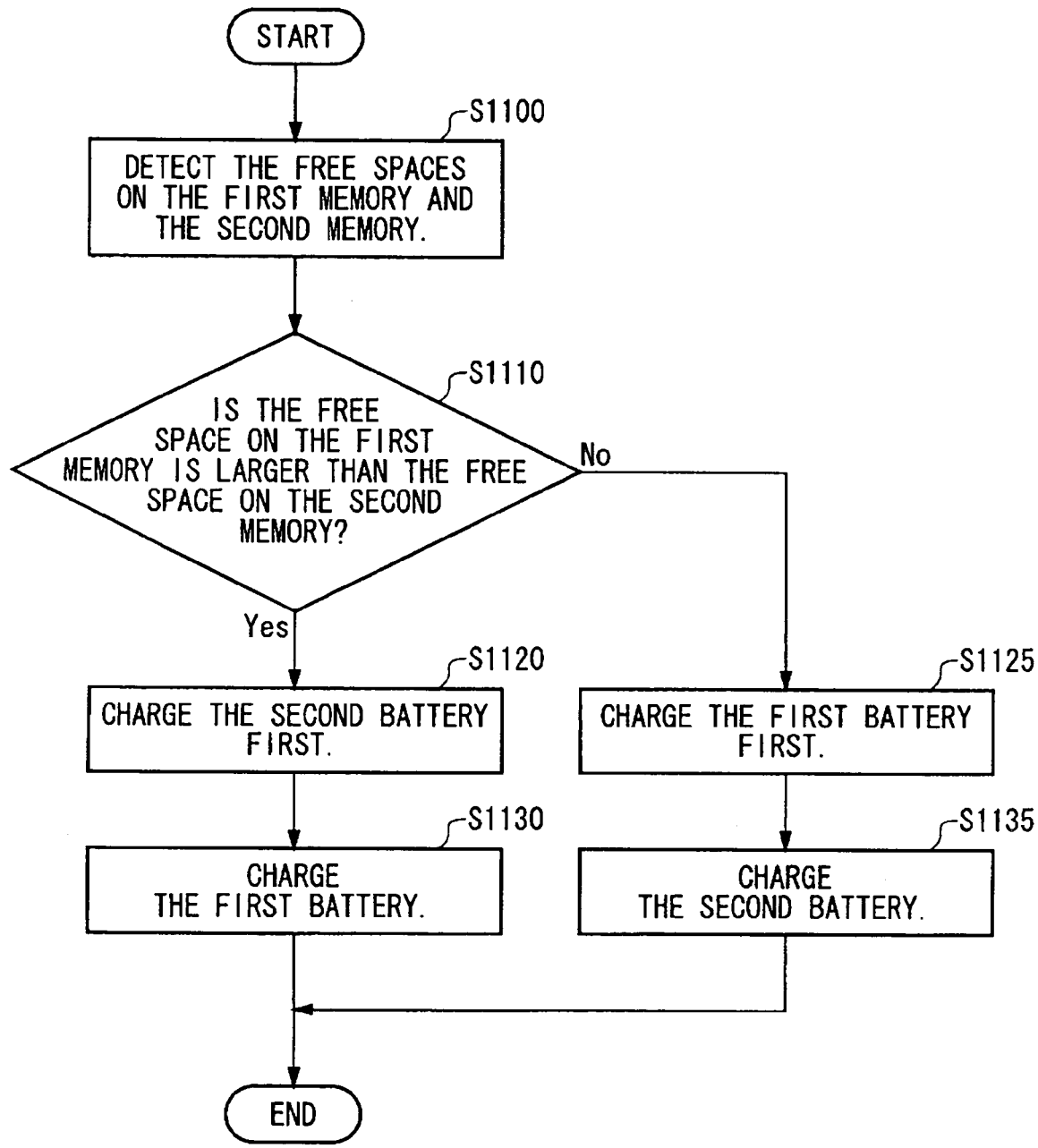
FIG. 7 is a flow chart showing the procedure used for the data processing apparatus 10.

FIG. 7 is a flow chart showing the data processing procedure of the data processing apparatus 10 related to the present embodiment. The first charge control section 270 and the second charge control section 340 detect the free spaces on the first memory 220 and the second memory 320 (S1100). The first charge control section 270 and the second charge control section 340 may calculate the ratios of free spaces on the first and second memories to the total capacities thereof respectively. The data processing apparatus 10 may further comprise a memory free space detector to calculate the free spaces on the first and second memories and the ratios of the free spaces thereon to the total capacities thereof respectively.

The first charge control section 270 and the second charge control section 340 determine whether the free space on the first memory 220 is larger than that on the second memory 320 or not (S1110). If the first charge control section 270 and the second charge control section 340 determine that the free space on the first memory 220 is larger than that on the second memory 320 (S1110: Yes), the second charge control section 340 charges the second battery 330 first (S1120). After the second battery 330 is completed to be charged, the first charge control section 270 charges the first battery 260 (S1130).

The first charge control section 270 and the second charge control section 340 determines that the free space on the first memory 220 is smaller than that on the second memory 320 (S1110: No.), the first charge control section 270 may charge the first battery 260 first (S1125). After the first battery 260 is completed to be charged, the second charge control section 340 may charge the second battery 330 (S1135).

According to the data processing apparatus 10 related to the present embodiment, the first memory 220 and the second memory 320 are given priorities to be charged depending on the free spaces thereon. This allows charging the second battery 330 included in the display unit 30 when the free space on the second memory 320 is small. The display unit 30 tends to be more often used than the image capturing unit 20.

Figure 8:
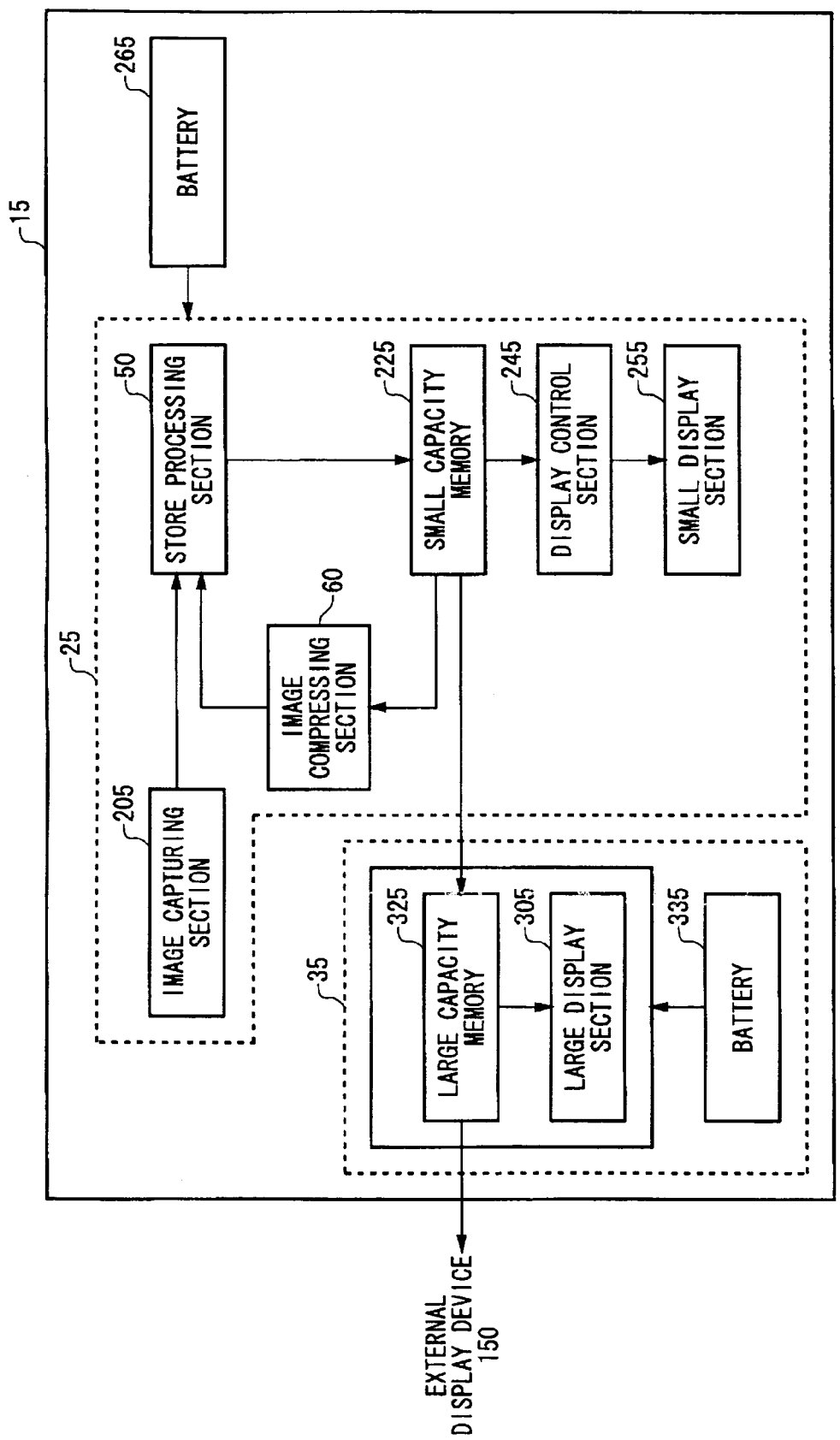
FIG. 8 is a block diagram showing the functional composition of the image capturing device 15.

FIG. 8 is a block diagram showing the functional composition of the image capturing device 15 related to the present embodiment. The image capturing device 15 comprises an image capturing unit 25, a display unit 35, and a battery 265. The image capturing unit 25 comprises an image capturing section 205, a small capacity memory 225, an image compressing section 60, a store processing section 50, a display control section, and a small display section 255. The display unit 35 comprises a large capacity memory 325, a large display section 305, and a battery 335. The image capturing device 15 may further comprise the components and all or a part of the functions of the data processing apparatus 10, data processing apparatus 12, and the data processing apparatus 14, all of which are described above using FIGS. 1-7.

The image captured by the image capturing section 205 is stored in the large capacity memory 325, which comprises the display unit 25, when the display unit 35 is connected with the image capturing unit 25. The large capacity memory 325 is a storage device which stores the image captured by the image capturing section 205, such as a hard disc drive using, for example, magnetic recording media. The large capacity memory 325 may also be a storage device which can be attached to and removed from the image capturing device 15 freely.

If the display unit 35 isn't connected with the image capturing unit 25, that is, if the large capacity memory 325 isn't connected to the image capturing unit 25, when the image capturing device 205 captures an image, the image captured by the image capturing device 205 may be temporarily stored in the small capacity memory 225 by the store processing section 50. The small capacity memory 225 has a smaller memory size than the large capacity memory 325, and is for example, a semiconductor memory such as a flash memory. The small capacity memory 225 may require smaller power for reading a captured image than the large capacity memory 325. Even if the large capacity memory 325 is connected with the image capturing unit 25, the store processing section 50 may store the image captured by the image capturing section 205 in the small capacity memory 225 temporarily.

The captured image stored in the large capacity memory 325 is provided to the image compressing section 60. When the captured image is stored in the small capacity memory 225, the captured image stored in the small capacity memory 225 is provided to the image compressing section 60. The image compressing section 60 receives the captured image and compresses it irreversibly. For example, the image compressing section 60 may compress the captured image with an image compression technology such as JPEG format when the still image is compressed irreversibly. The image compressing section 60 may compress the captured image with an image compression technology such as MPEG format when the moving image is compressed irreversibly. The image compressing section 60 provides the compressed image to the store processing section 50.

The image compressing section 60 may reduce the size or resolution of an image to compress the image irreversibly. The captured image stored in the large capacity memory 325 may be a compressed image. In this case, the image compressing section 60 may further compress the captured image with a higher compression ratio irreversibly. More preferably, the image compressing section 60 may compress an image with a much higher compression ratio by, for example, reducing the number of frequency components of the image to be stored or the number of bits indicating the level of the frequency component when the image is converted the frequency in every region to be stored.

The store processing section 50 receives the image compressed by the image compressing section 60, and provides the compressed image to the small capacity memory 225. The small capacity memory 225 receives and gives the compressed image the identifier to store it. With the identifier, the compressed image can be related only to the original image, which isn't compressed. If a plurality of images captured by the image capturing section 205 is stored in the small capacity memory 225 temporarily, the small capacity memory 225 may transfer the stored images collectively. The store processing section 50 may transfer the captured image stored in the small capacity memory 225 to the large capacity memory 325 automatically. The store processing section 50 may temporarily store the image captured by the image capturing section 205 in the small capacity memory 225, and transfer the captured image to the large capacity memory 325 when no image capturing operation. The store processing section 50 may temporarily store the images captured by the image capturing section 205 in the small capacity memory 225, and collectively transfer the captured images to the large capacity memory 325 when no image capturing operation.

For example, the store processing section 50 may transfer the captured image automatically from the small capacity memory 225 to the large capacity memory 325 when at least a part of each component of the store processing section 50, except for the store processing section 50 of the data processing apparatus 15 and the small capacity memory 225, isn't supplied with power. The store processing section 50 may collectively transfer the plurality of the captured images to the large capacity memory 325 at the timing when the number of the stored images reaches the predetermined number. The store processing section 50 transfers the plurality of the captured images collectively from the small capacity memory 225 to the large capacity memory 325 so that the power consumption of using the small capacity memory 225 is smaller than the large capacity memory 325 because the driving time of the large capacity memory 325 decreases, which an reduce the power consumption of the image capturing device 15.

The store processing section 50 may transfer the captured images collectively to the large capacity memory 325 when the free space on the small capacity memory 225 becomes smaller than the predetermined reference value. This allows the image capturing device 15 to save power consumption more efficiently than the case in which the large capacity memory 325 is operated to store the image in every time when an image is captured by the image capturing section 205, because the number of booting, operating, and stopping the large capacity memory 325 can be reduced. If the captured image is transferred from the small capacity memory 225 to the large capacity memory 325, the captured image stored in the small capacity memory 225 can be deleted.

The store processing section 50 may transfer the captured image from the small capacity memory 225 to the large capacity memory 325 and hold the compressed image in the small capacity memory 225 when the image capturing device 15 is being supplied power externally. When the image capturing device 15 isn't being supplied power externally, the store processing section 50 doesn't transfer the captured image from the small capacity memory 225 to the large capacity memory 325 and may keep the small capacity memory 225 waiting to transfer the captured image to the large capacity memory 325 until the image capturing device 15 is supplied power. This prevents using the battery 265 and the battery 335, both of which comprise the image capturing device 15, because the captured image isn't transferred so that the battery 265 and the battery 335 of the image capturing device 15 can be used longer. This allows the user to take more pictures using the image capturing device 15.

The store processing section 50 may transfer the captured image, which is stored in the small capacity memory 225 temporarily by the store processing section 50 when the large capacity memory 325 isn't connected to the image capturing unit 25, from the small capacity memory 225 to the large capacity memory 325 when the large capacity memory 325 is connected to the image capturing unit 25. The store processing section 50 may hold the compressed image in the small capacity memory 225. The small capacity memory 225 provides the compressed image to the display control section 245. The large capacity memory 325 provides the captured image to the large display section 305 and the external display device 150.

The display control section 245 provides the compressed image received from the small capacity memory 225 to the small display section 255. The small display section 255 displays the compressed image received. The small display section 255 may be a display device such as a liquid crystal display device having a smaller pixels than the captured image. The user can check the compressed image read from the small capacity memory 225 with the small display section 255 included in the image capturing unit 25 even if the large capacity memory 325 is removed from the image capturing device 15.

The power consumption required for displaying the compressed image on the small display section 255 is smaller than that required for displaying the captured image thereon. The data amount of the compressed image is smaller than that of the captured image. The small display section 255 can save the power consumption while displaying the compressed image thereon more efficiently than displaying the image which isn't compressed thereon. The power consumption required for reading from and writing to a semiconductor memory is smaller than that required by a hard disc drive so that if the small capacity memory 225 is the semiconductor memory, the power consumption is smaller than if the small capacity memory 225 is the hard disc drive.

The large display section 305 may have more pixels than the small display section 255, and may be assembled together with the large capacity memory 325. The large display section 305 may be, for example, a liquid crystal display device, and may be a display device which can display the captured image more clearly than the small display section 255. The large display section 305 reads the captured image from the large capacity memory 325 to display the captured image. The external display device 150 may be a display device which receives the captured image from the large capacity memory 325 to display the captured image, for example, a personal computer, a TV monitor like a high-definition television, or other monitors. The external display device 150 may also comprise a storage device such as a hard disc to store the captured image received from the large capacity memory 325.

The battery 265 supplies operating power to the image capturing section 205, the small capacity memory 225, the image compressing section 60, the store processing section 50, the display control section 245, and the small display section 255, each of which is included in the image capturing unit 25. The battery 335 supplies operating power to the large capacity memory 325 and the large display section 305, both of which are included in the display unit 35.

According to the image capturing device 15 related to the present embodiment, the image capturing unit 25 comprising the image capturing device 15 can store the compressed image. This allows the user to check the captured image by reviewing the compressed image on the image capturing device 15 even after the captured image is transferred from the image capturing device 15. Even if taking a lot of pictures, the user can prevent from taking another picture of the same object, and from forgetting to take a picture of the object which is yet taken a picture.

According to the image capturing device 15 related to the present embodiment, the captured image can be stored in the small capacity memory 225 which consumes smaller power than the large capacity memory 325 and transferred from the small capacity memory 225 to the large capacity memory 325 in a certain condition. This allows the image capturing device 15 to save the power consumption required for capturing images. Especially, using the image capturing device 15 driven by a battery, if the power consumption of the image capturing device 15 is small, the user can take pictures of various sceneries and objects in a long time.

According to the image capturing device 15 related to the present embodiment, the captured image can be stored in the small capacity memory 225 temporarily, and transferred from the small capacity memory 225 to the large capacity memory 325 on a certain condition. For example, when the user turn off the image capturing device 15, the store processing section 50 boots up automatically to transfer the captured image from the small capacity memory 225 to the large capacity memory 325. This allows the user to take pictures without taking care of how the small capacity memory 225 has free space.

The image capturing device 15 may further comprise the components and functions described above using FIGS. 3-5. This allows the batteries which supply power to the image capturing unit 25 and the display unit 35 to be charged by giving the priorities the image capturing unit 25 and the display unit 35.

Figure 9:
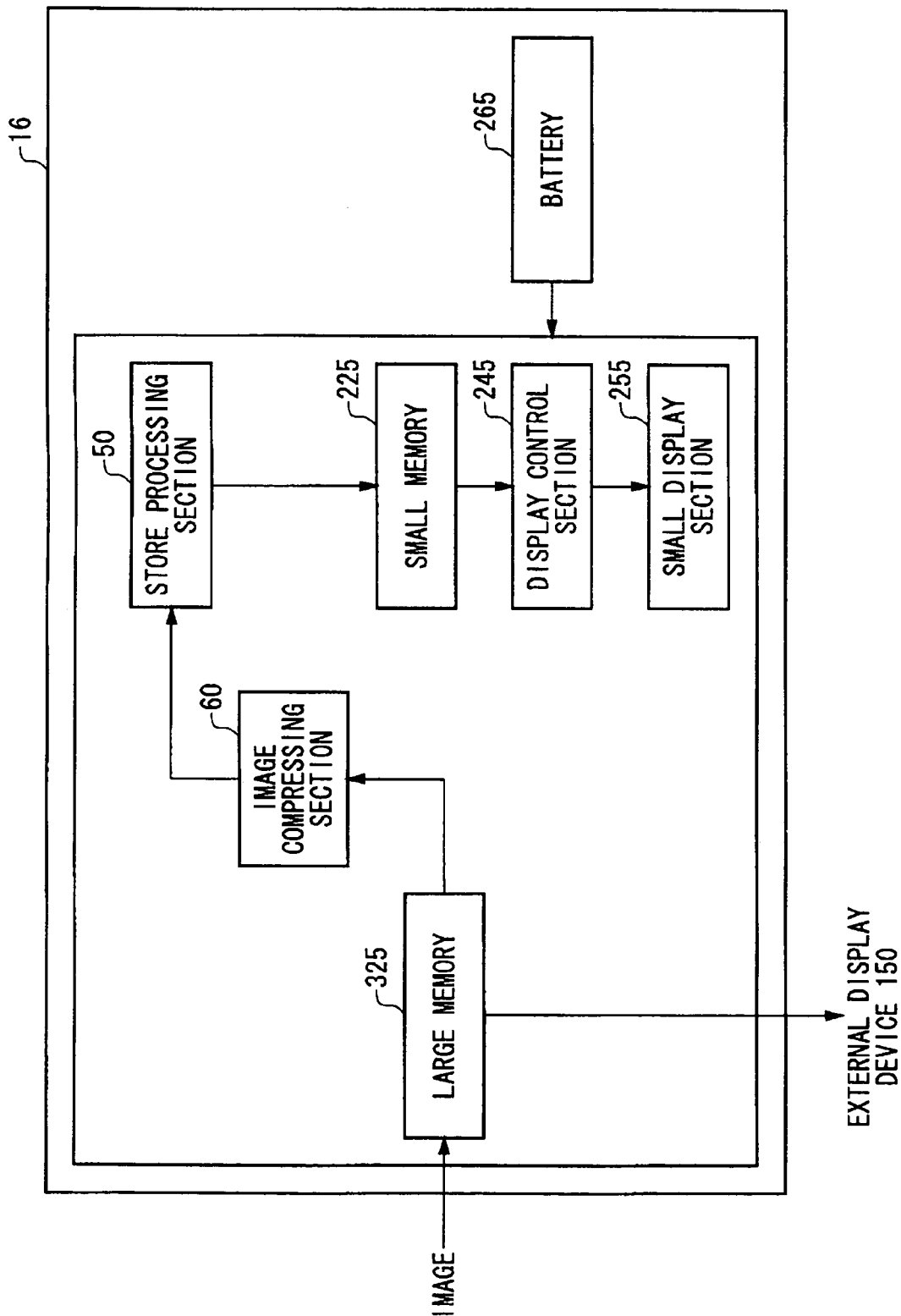
FIG. 9 is a block diagram showing the functional composition of the image storing device 16.

FIG. 9 is a block diagram showing the functional composition of the image capturing device 16 related to the present embodiment. The image storing device 16 comprises a large capacity memory 325, a small capacity, memory 225, an image compressing section 60, a store processing section 50, a display control section 245, a small display section 255, and a battery 265. The large capacity memory 325, the small capacity memory 225, the image compressing section 60, the store processing section 50, the display control section 245, the small display section 255, and the battery 265 have the approximately same functions as the components with the same names respectively, so the descriptions of these are omitted. The image storing device 16 may further comprise all or a part of the components and functions of the data processing apparatus 10, data processing apparatus 12, and data processing apparatus 14 described above using FIGS. 1-7.

The image storing device 16 receives a lot of captured images from the image capturing device 15, memories, and networks such as the Internet. The large capacity memory 325 stores the lot of captured images received as corresponding to the identifiers which can relate to only one captured image. The large capacity memory 325 provides the captured image stored to the image compressing section 60, and the image compressing section 60 compresses the captured image received. The memory 325 may provide the captured image to the external display device 150. The captured image is provided to the external display device 150 so that the user can see the captured image displayed on the large display screen. The image storing device 16 may comprise the large display section having more pixels than the small display section 255. If the image storing device 16 comprises the large display section, the user can check the captured image in a larger size and more clearly than the compressed image.

The compressed image, which is compressed by the image compressing section 60, is provided to the small capacity memory 225 by the store processing section 50, and the small capacity memory 225 stores the compressed image corresponding to the identifier which relates to only one compressed image. The small capacity memory 225 provides the compressed image to the display control section 245. The display control section 245 provides the compressed image received to the small display section 255. The small display section 255 displays the compressed image received. The battery 265 supplies operating power to the large capacity memory 325, the small capacity memory 225, the image compressing section 60, the store processing section 50, the display control section 245, the small display section 255, and the battery 265, each of which comprises the image storing device 16.

According to the image storing device 16 related to the present embodiment, the image storing device 16 can store a plenty of captured images received from the image capturing device 15, and display the compressed images of the captured images. This allows the user to check the captured image by reviewing the compressed image with the image storing device 16, not with the image capturing device 15. For example, a user can take pictures with the image capturing device 15 as requested by another user who can check the captured image displayed on the image storing device 16 to find the object which is yet captured, and request to capture the image of the object to the other user. These two users can share such operation so that they can take pictures to be seen efficiently.

Figure 10:
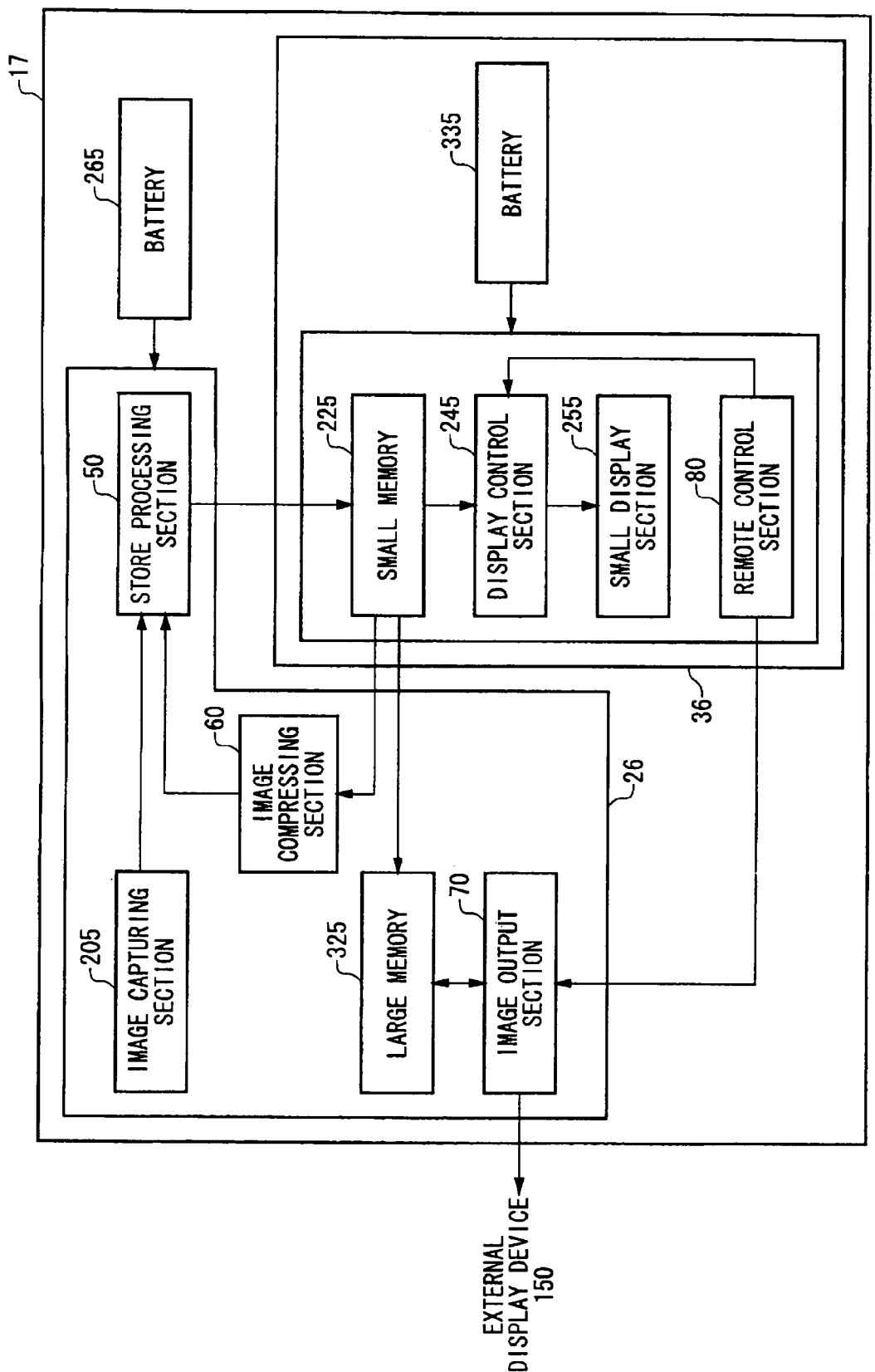
FIG. 10 is a block diagram showing the functional composition of the image capturing device 17.

FIG. 10 is a block diagram showing the functional composition of the image capturing device 17 related to the present embodiment. The image capturing device 17 comprises an image capturing unit 26, a remote control unit 36, and a battery 265. The image capturing unit 26 comprises an image capturing section 205, a large capacity memory 325, a store processing section 50, an image compressing section 60, and an image output section 70. The image capturing unit 26 may be, for example, a digital camera. The remote control unit 36 comprises a small capacity memory 225, a display control section 245, a small display section 255, a remote control section 80, and a battery 335. The remote control unit 36 may be, for example, a mobile viewer. The image capturing device 17 may further comprise all or a part of the components and functions of the data processing apparatus 10, data processing apparatus 12, and the data processing apparatus 14, all of which are described above using the FIGS. 1-7.

The image captured by the image capturing section 205 is temporarily provided to the small capacity memory 225 by the store processing section 50. The small capacity memory 225 stores the captured image received from the image capturing section 205 via the store processing section 50 as corresponding to the identifier which relates only to the captured image. The small capacity memory 225 may be a storage device which has a smaller memory size and smaller power consumption than the large capacity memory 325, for example, a semiconductor memory such as a flash memory.

The small capacity memory 225 provides the captured image to the image compressing section 60. The image compressing section 60 irreversibly compresses the captured image received from the small capacity memory 225. For example, the image compressing section 60 may compress the captured image with an image compression technology such as JPEG format when the still image is compressed irreversibly. The image compressing section 60 may compress the captured image with an image compression technology such as MPEG format when the moving image is compressed irreversibly. The store processing section 50 receives the compressed image, which is compressed by the image compressing section 60, from the image compressing section 60, and provides the compressed image to the small capacity memory 225. The small capacity memory 225 stores the compressed image from the image compressing section 60 via the store processing section 50 as corresponding to the identifier which can relates the compressed image only to the original captured image which isn't compressed. The small capacity memory 225 provides the compressed image to the display control section 245.

The image compressing section 60 may reduce the size or resolution of an image to compress the image irreversibly.

The captured image stored in the large capacity memory 325 may be a compressed image. In this case, the image compressing section 60 may further compress the captured image with a higher compression ratio irreversibly. More preferably, the image compressing section 60 may compress an image with a much higher compression ratio by, for example, reducing the number of frequency components of the image to be stored or the number of bits indicating the level of the frequency component when the image is heterodyned in every region to be stored.

The store processing section 50 may transfer a plurality of images, which are captured by the image capturing section 205 and temporarily stored in the small capacity memory 225, to the large capacity memory 325 collectively. The store processing section 50 may automatically transfer the image stored in the small capacity memory 225. The store processing section 50 may temporarily store the image captured by the image capturing section 205 in the small capacity memory 225, and transfer the captured image to the large capacity memory 325 when no image capturing operation. The store processing section 50 may temporarily store the images captured by the image capturing section 205 in the small capacity memory 225, and collectively transfer the captured images to the large capacity memory 325 when no image capturing operation.

The large capacity memory 325 may be a storage device which stores the captured image captured by the image capturing device 205, for example, a hard disc drive using magnetic storage media. The store processing section 50 may collectively transfer the plurality of the captured images from the small capacity memory 225 to the large capacity memory 325 at the timing when the number of the stored images reaches the predetermined number. The store processing section 50 may transfer the captured images collectively to the large capacity memory 325 when the free space on the small capacity memory 225 becomes smaller than the predetermined reference value.

This allows the image capturing device 15 to save power consumption more efficiently than the case the large capacity memory 325 is operated to store the image in every time when an image is captured by the image capturing section 205, because the number of booting, operating, and stopping the large capacity memory 325 can be reduced.

The store processing section 50 may transfer the captured image from the small capacity memory 225 to the large capacity memory 325 and hold the compressed image in the small capacity memory 225 when the image capturing device 17 is being supplied power externally. When the image capturing device 17 isn't being supplied power externally, the store processing section 50 doesn't transfer the captured image from the small capacity memory 225 to the large capacity memory 325 and may keep the small capacity memory 225 waiting to transfer the captured image to the large capacity memory 325 until the image capturing device 17 is supplied power. If the captured image is transferred from the small capacity memory 225 to the large capacity memory 325, the captured image can be deleted from the small capacity memory 225. This can prevent the small capacity memory 225 from running out of the capacity because of the captured image which has a larger data size than the compressed image.

This prevents from using the battery 265, which comprises the image capturing device 17, and the battery 335 for transferring the captured image so that the power consumption required for transferring can be saved and the battery 265 of the image capturing device 17 and the battery 335 can be used longer. This allows the user to take more pictures using the image capturing device 17.

The display section 245 provides the small display section 255 with the compressed image received from the small capacity memory 225. The display section 255 displays the compressed image received from the small capacity memory 225 via the display control section 245. The small display section 255 may be a display section which has smaller pixels than the captured image, for example, a display device such as a liquid crystal display device.

The power consumption required for displaying the compressed image on the small display section 255 is smaller than that required for displaying the captured image thereon. The data amount of the compressed image is smaller than that of the captured image. The small display section 255 can save the power consumption while displaying the compressed image thereon more efficiently than displaying the image which isn't compressed thereon. If the small capacity memory 225 is the semiconductor memory, the power consumption required for reading image data from and writing image data to a semiconductor memory is smaller than that required by a hard disc drive so that the power consumption is smaller than if the small capacity memory 225 is the hard disc drive.

The remote control section 80 is assembled together with the small capacity memory 225 and the small display section 255. The small capacity memory 225 as well as the small display section 255 can be attached to and removed from the image capturing device 17. The remote control unit 36 can also be attached to and removed from the image capturing device 17. If the user connects the image capturing unit 26 with the external display device 150, therefore, when the remote control unit 36 is separate from the image capturing unit 26 included in the image capturing device 17, the user can bring with the remote control unit 36.

The remote control section 80 sends the image selecting information to the image output section 70. The image selecting information indicates the captured images which correspond to the compressed images the user selects with the remote control section 80. The user selects the compressed images displayed on the small display section 255 included in the remote control unit 36, which correspond to the captured images that the user wants to display on the external display device 150. When the user select the compressed images displayed on the small display section 255, the remote control section 80 sends the image selecting information related to the user selected compressed image to the image output section 70. The image identifier is an example of the image selecting information. The remote control section 80 control the small display section 255 to display the compressed image corresponding to the captured image which will be displayed on the external display device next. When the user selects the compressed image corresponding to the captured image, the remote control section 80 may send the image selecting information which designates the captured image corresponding to the compressed image to the image output section 70.

The image output section 70 reads the captured image stored in the large capacity memory 325 with the image selecting information received from the remote control section 80. The image output section 70 provides the captured image read from the large capacity memory 325 to the external display device 150 connected with the image capturing unit 26. The external display device 150 displays the captured image received from the image output section 70. The external display device 150 may be, for example, a personal computer, a television monitor such as a high-definition TV or other monitors.

The battery 265 provides driving power to the image capturing section 205, the large capacity memory 325, the store processing section 50, the image compressing section 60, and the image output section 70, each of which is included in the image capturing unit 26. The battery 335 provides driving power to the small capacity memory 225, the display control section 245, the small display section 255, and the remote control section 80, each of which is included in the remote control unit 36.

According to the image capturing device 17 related to the present embodiment, the compressed image related to the captured image can be stored in the remote control unit 36 included in the image capturing device 17, and the user can check the compressed image stored in the remote control unit 36 by displaying the compressed image on the small display section 255 included in the remote control unit 36. If the image capturing unit 26 is connected to the external display device 150, the remote user just selects the compressed image which the user wants to see with the remote control unit 36 and can freely display the captured image which the user wants to see on the external display device 150.

The image capturing device 17 related to the present embodiment can further comprise the components described above using FIGS. 3-5. In this case, the image capturing unit 26 and the remote control unit 36 can be given priorities to be charged batteries which supply power to the image capturing unit 26 and the remote control unit 36.

Figure 11:
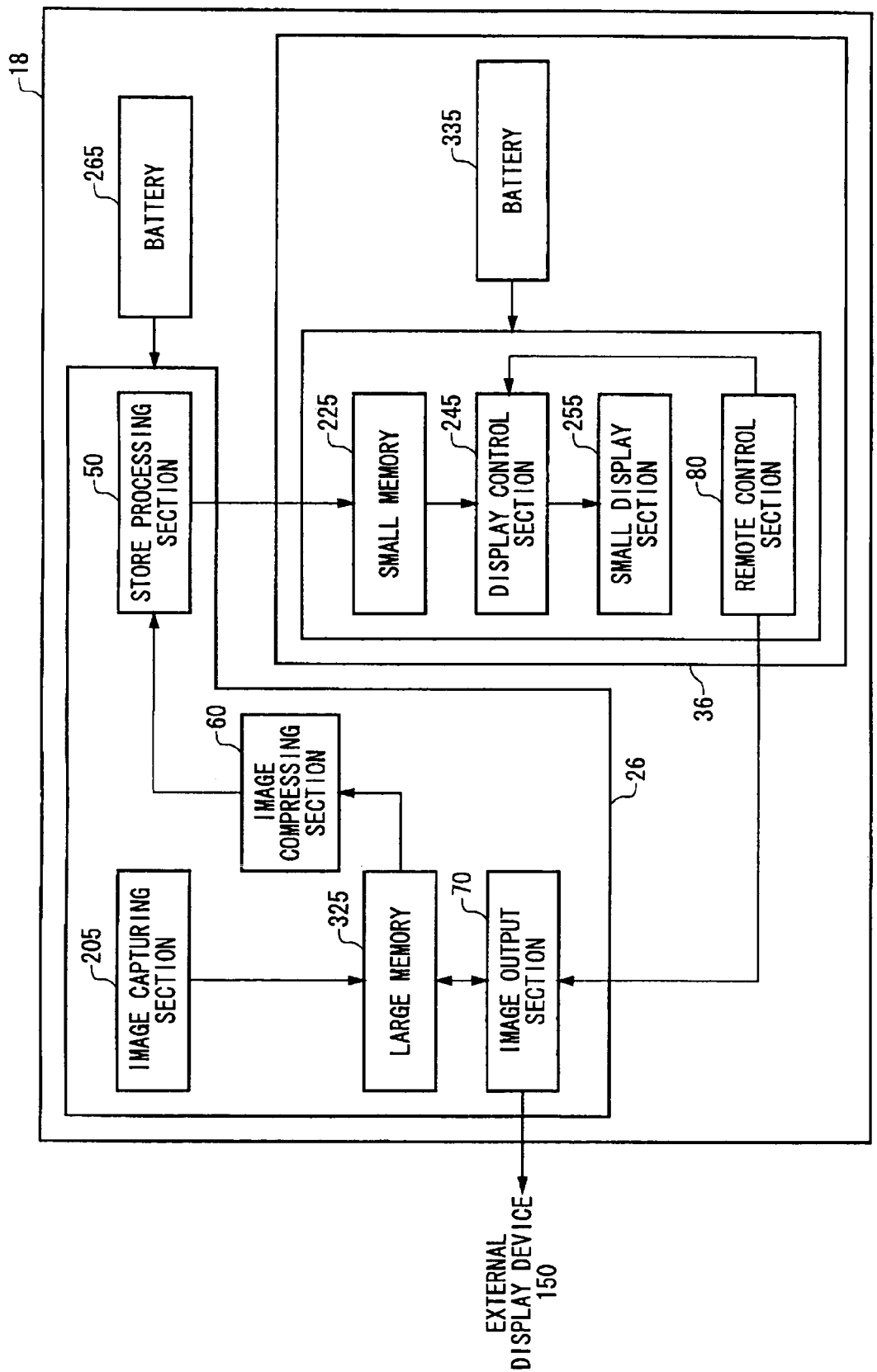
FIG. 11 is a block diagram showing the functional composition of the image capturing device 18.

FIG. 11 is a block diagram showing the functional composition of the image capturing device 18 related to the present embodiment. The image capturing unit 26, the remote control unit 36, the battery 265, the image capturing section 205, the large capacity memory 325, the store processing section 50, the image compressing section 60, the image output section 70, the small capacity memory 225, the display control section 245, the small display section 255, the remote control section 80 and the battery 335 have the approximately same functions of the components having the same names and described above using FIG. 10 respectively. The detailed descriptions of these are omitted. The image capturing device 18 may further comprise all or a part of the components and functions of the data processing apparatus 10, data processing apparatus 12, and the data processing apparatus 14, each of which is described above using FIGS. 1-7.

The image captured by the image capturing section 205 may be stored in the large capacity memory 325 corresponding to the image identifier which relates only to the captured image. The large capacity memory 325 provides the captured image to the image compressing section 60. The compressed image which is compressed by the image compressing section 60 is provided to the small capacity memory 225 via the store processing section 50. The small capacity memory 225 stores the compressed image corresponding to the image identifier which relates only to the captured image.

The compressed image stored in the small capacity memory 225 provides to the small display section 255 via the display control section 245. The small display section 255 displays the compressed image received. The remote control section 80 sends the image selecting information to the image output section 70. The image selecting information indicates the captured images which correspond to the compressed images the user selects with the remote control section 80. The remote control section 80 may control the small display section 255 to display the compressed image related to the captured image to be displayed on the external display device 150, and when the user selects the compressed image related to the captured image, may send the image selecting information which designates the captured image related to the compressed image to the image output section 70.

The image output section 70 reads the captured image from the large capacity memory 325. The captured image is stored in the large capacity memory 325 and corresponds to the image selecting information which the image output section 70 receives from the remote control section 80. The image output section 70 provides the captured image read from the large capacity memory 325 to the external display device 150 connected to the image capturing unit 26. The external display device 150 displays the captured image received from the image output section 70.

Figure 12:
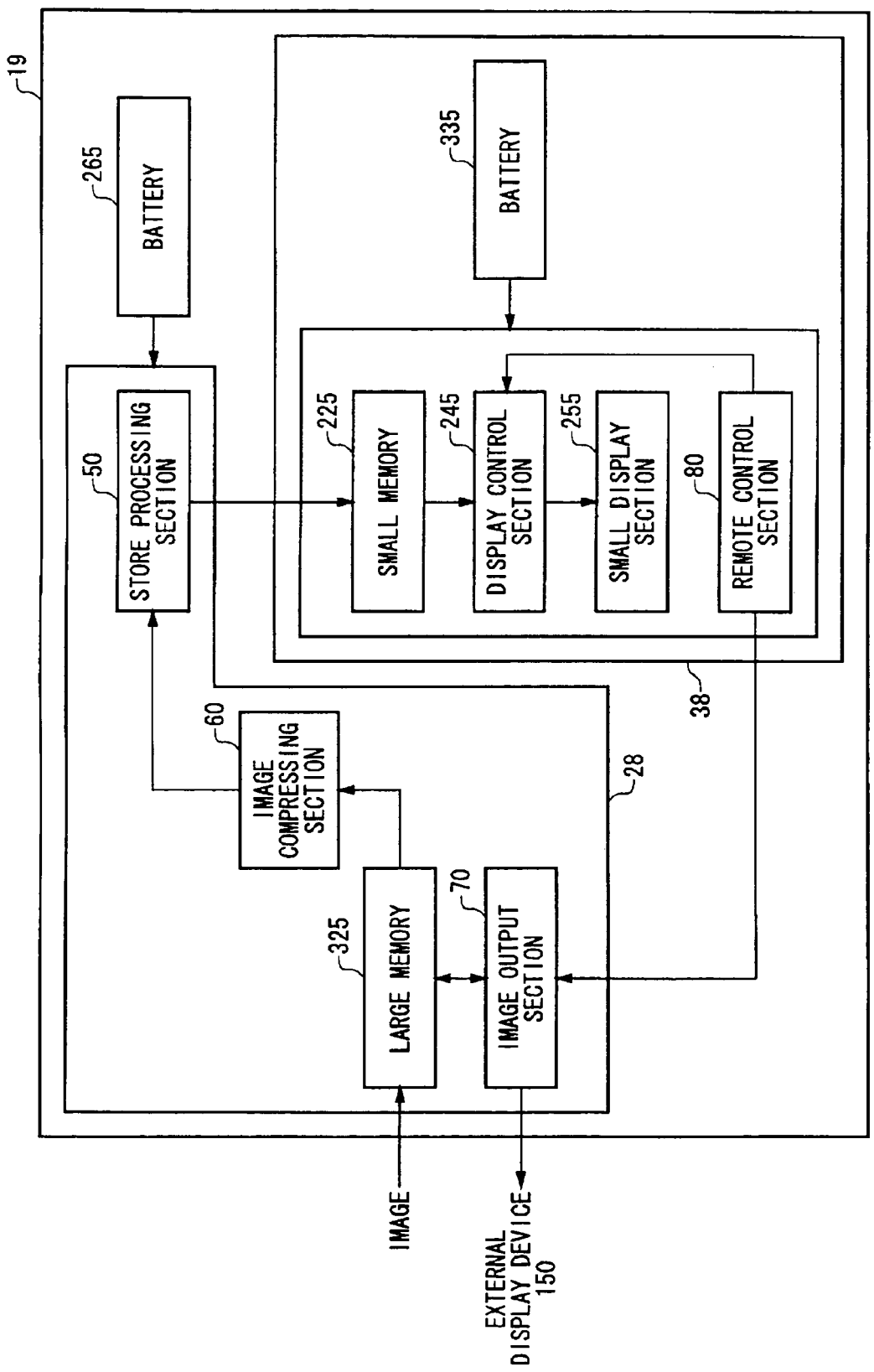
FIG. 12 is a block diagram showing the functional composition of the image storing device 19. Descriptions of reference number.

FIG. 12 is a block diagram showing the functional composition of the image storing device related to the present embodiment. The image storing device 19 comprises an image storing unit 28, a remote control unit 38, and a battery 265. The image storing unit 28 comprises a large capacity memory 325, a store processing section 50, an image compressing section 60, and an image output section 70. The image storing unit 28 may be, for example, a mobile viewer. The remote control unit 38, battery 265, the large capacity memory 325, the store processing section 50, the image compressing section 60, the image output section 70, the small capacity memory 225, the display control section 245, the small display section 255, the remote control section 80, and the battery 335 have the same functions of the components having the same reference numbers respectively described above using FIG. 11, and the descriptions of these are omitted. The image storing device 19 may further comprise all or a part of the components and functions of the data processing apparatus 10, data processing apparatus 12, and the data processing apparatus 14, each of which is described above using FIGS. 1-7.

The image storing device 19 receives a lot of captured images from the image capturing device 17, memories, and networks such as the Internet. The captured images are provided to and stored in the large capacity memory 325 with corresponding image identifiers related to each captured image. The large capacity memory 325 provides the captured image to the image compressing section 60. The image is compressed by the compressing section 60, and provided to the small capacity memory 225 via the store processing section 50. The small capacity memory 225 stores the compressed image corresponding to the image identifier which can identify the compressed image. The image storing unit 28 may comprise a display device which has more pixels than the small display section 255 included in the remote control unit 38. If the image storing unit 28 comprises such display device, the user can check the captured image on the image storing unit 28 included in the image storing device 19.

The compressed image stored in the small capacity memory 225 is provided to the small display section 255 via the display control section 245, and displayed on the small display section 255. The remote control section 80 sends the image selecting information to the image output section 70. The image selecting information designates the captured image corresponding to the compressed image selected by the user with the remote control section 80. The remote control section 80 may control the small display section to display the compressed image corresponding to the captured image to be displayed on the external display device 150, when the user selects the compressed image corresponding to the captured image, the remote control section 80 may send the image selecting information which designates the captured image corresponding to the compressed image to the image output section 70.

The image output section 70 reads the captured image from the large capacity memory 325. The captured image is stored in the large capacity memory 325 corresponding to the image selecting information which the image output section 70 receives from the remote control section 80. The image output section 70 provides the captured image read from the large capacity memory 325 to the external display device 150 connected to the image capturing unit 26. The external display device 150 displays the captured image received from the image output section 70.

According to the image storing device 19 related to the present embodiment, the compressed image, which corresponds to the captured image received from the image capturing device 17, can be stored in the remote control unit 38 included in the image storing device 19. The user can check the compressed image stored in the remote control unit 38 with the small display section 255 included in the remote control unit 38. When the image storing unit 28 is connected with the external display device 150, the remote user can see the captured image which is desired to see and displayed on the external display device 150 only by selecting the compressed image corresponding to the captured image with the remote control unit 38.

The image storing device 19 related to the present embodiment may further comprise all or a part of the components and functions of the data processing apparatus 10, data processing apparatus 12, and the data processing apparatus 14, each of which is described above using FIGS. 1-7. In this case, the image storing unit 28 and the remote control unit 38 are given priorities to be charged, and the batteries supplying power to the image storing unit 28 and the remote control unit 38 can be charged by the priorities.

The above description explaining the present invention with the embodiments does not limit the technical scope of the invention to the above description of the embodiments. It is apparent for those in the art that various modifications or improvements can be made to the embodiments described above. It is also apparent from what we claim that other embodiments with such modifications or improvements are included in the technical scope of the present invention.

What is claimed is:

1. A data processing apparatus charged by a battery charger which has a terminal, comprising:
    a first data processing unit including a first battery and a first power supply terminal for being electrically connected to the terminal of the battery charger to supply power to the first battery; and
    a second data processing unit including a second battery and a second power supply terminal for being electrically connected to the terminal of the battery charger to supply power to the second battery, said second data processing unit being removably attached to said first data processing unit,
    wherein the first and second power supply terminals are disposed on said first and second data processing units, respectively, such that the first and second power supply terminals are selectively connected to the terminal of the battery charger in accordance with the orientation of said first and second data processing units with respect to the battery charger when said first and second data processing units are attached to each other and mounted on the battery charger.

2. The data processing apparatus according to claim 1, wherein said first data processing unit further includes an image capturing section, a first memory and a first data control section,
    wherein the first data control section writes the image captured by the image capturing section to the first memory,
    wherein said second data processing unit further includes a display section, a second memory and a second data control, and
    wherein the second data control section displays the image read from the second memory on the display section.

3. The data processing apparatus according to claim 1, further comprising a data transfer control section for transferring the image, which is captured by the image capturing section and stored in the first memory, to the second memory when said first data processing unit is mechanically connected with said second data processing unit,
    wherein said first data processing unit independently functions as an image capturing apparatus when is not connected mechanically to said second data processing unit, and
    wherein said second data processing unit independently functions as a display device when it is not connected mechanically to said first data processing unit.

4. The data processing apparatus according to claim 1, further comprising a charge control section for supplying power to the first battery from the battery charger to charge the first battery when the charge control section is connected to the battery charger, and supplying power to the second battery from first battery to charge second battery when the charge control section is not connected to the battery charger.

5. The data processing apparatus according to claim 1, wherein said first data processing unit includes a first surface and said second data processing unit includes a second surface which is on the same plane as the first surface when said first and second data processing units are attached to each other, the first and second power supply terminals are placed on the first surface of said first data processing unit and the second surface of said second data processing unit, respectively, and the first and second power supply terminals are placed in symmetry to each other when said first and second data processing units are attached to each other.

6. The data processing apparatus according to claim 5, wherein the plane is the bottom surface of the data processing apparatus when the data processing apparatus is mounted on the battery charger.

7. The data processing apparatus according to claim 1, wherein said first data processing unit includes a first surface lying on a first plane and said second data processing unit includes a second surface lying on a second plane which is different from the first plane when said first and second data processing units are attached to each other, the first and second power supply terminals are placed on the first surface of said first data processing unit and the second surface of said second data processing unit, respectively, and the first and second power supply terminals are placed in symmetry to each other when said first and second data processing units are attached to each other.

8. The data processing apparatus according to claim 6, wherein the first plane is opposite to the second plane when said first and second data processing units are attached to each other.

9. The data processing apparatus according to claim 8, wherein the first plane is a top surface of the data processing apparatus and the second plane is a bottom surface of the data processing apparatus when the data processing apparatus is mounted on the battery charger.

10. A system comprising:
    the data processing apparatus according to claim 1; and
    a battery charger for charging the data processing apparatus.

11. The system according to claim 10, wherein the battery charger includes:
    a primary terminal for being electrically connected to one of the first power supply terminal and the second power supply terminal;
    a secondary terminal for being electrically connected to one of the first power supply terminal and the second power supply terminal, wherein the secondary terminal is electrically connected to the second power supply terminal when the primary terminal is electrically connected to the first power supply terminal, and the secondary terminal is electrically connected to the first power supply terminal when the primary terminal is electrically connected to the second power supply terminal; and
    a charge control section for charging the first battery and the second battery, wherein the charge control section charges the first battery prior to the second battery when the first power supply terminal is electrically connected to the primary terminal, and charges the second battery prior to the first battery when the first power supply terminal is electrically connected to the secondary terminal.

* * * * *